US011284414B2

(12) United States Patent
Fakoorian et al.

(10) Patent No.: US 11,284,414 B2
(45) Date of Patent: Mar. 22, 2022

(54) PREEMPTION INDICATION FOR LOW LATENCY COMMUNICATIONS ON DYNAMICALLY ALLOCATED RESOURCES

(71) Applicant: QUALCOMM Incorporated, San Diego, CA (US)

(72) Inventors: Seyed Ali Akbar Fakoorian, San Diego, CA (US); Jing Sun, San Diego, CA (US); Xiaoxia Zhang, San Diego, CA (US); Chih-Hao Liu, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/381,277

(22) Filed: Apr. 11, 2019

(65) Prior Publication Data

US 2019/0320448 A1    Oct. 17, 2019

Related U.S. Application Data

(60) Provisional application No. 62/657,657, filed on Apr. 13, 2018.

(51) Int. Cl.
*H04W 72/02* (2009.01)
*H04W 72/12* (2009.01)

(52) U.S. Cl.
CPC ... *H04W 72/1242* (2013.01); *H04W 72/1289* (2013.01)

(58) Field of Classification Search
CPC ......... H04W 72/1242; H04W 72/1289; H04W 52/36; H04W 72/0446
See application file for complete search history.

(56) References Cited

U.S. PATENT DOCUMENTS

2018/0070369 A1* 3/2018 Papasakellariou .... H04W 16/14
2018/0242291 A1* 8/2018 Moon ................... H04L 5/0094
(Continued)

OTHER PUBLICATIONS

U.S. Appl. No. 62/564,771, Babaei, Pre-emption indication in a wireless network and wireless device, pp. 1-44, (Year: 2017).*
(Continued)

*Primary Examiner* — Steven H Nguyen
(74) *Attorney, Agent, or Firm* — Qualcomm Incorporated

(57) ABSTRACT

Some wireless communications systems may support different types of communications between base stations and user equipment (UEs), such as mobile broadband (MBB) communications and low latency communications. Low latency communications may be associated with bursty and unpredictable transmissions. As described herein, to facilitate low latency communications and limit the latency associated with waiting on appropriate resources for transmitting low latency data, a base station may schedule downlink low latency transmissions on uplink resources or uplink low latency transmissions on downlink resources. Further, to limit the latency associated with scheduling low latency communications, a base station may be configured with a carrier for transmitting preemption indications (PIs) to one or more UEs to reassign resources for low latency communications. Similarly, in some cases, a UE may be configured with a carrier to transmit scheduling requests (SRs) to request resources for low latency communications.

19 Claims, 19 Drawing Sheets

(56) References Cited

U.S. PATENT DOCUMENTS

| | | | | |
|---|---|---|---|---|
| 2018/0367289 | A1* | 12/2018 | Kim | H04L 5/0094 |
| 2019/0052432 | A1* | 2/2019 | Islam | H04W 76/27 |
| 2019/0098612 | A1* | 3/2019 | Babaei | H04W 72/1289 |
| 2019/0253137 | A1* | 8/2019 | Sun | H04W 72/1289 |
| 2019/0280802 | A1* | 9/2019 | Ma | H04W 76/11 |
| 2019/0297638 | A1* | 9/2019 | Park | H04W 72/042 |
| 2019/0327757 | A1* | 10/2019 | Oteri | H04L 5/0053 |
| 2019/0349795 | A1* | 11/2019 | Park | H04W 24/08 |
| 2020/0288482 | A1* | 9/2020 | Yi | H04W 72/1289 |
| 2020/0351887 | A1* | 11/2020 | Miao | H04W 76/27 |

OTHER PUBLICATIONS

Huawei, et al., "On Pre-emption Indication for DL Multiplexing of URLLC and eMBB", 3GPP Draft; R1-1717081, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340272, 15 pages, Retrieved from the Internet: URL: http://www.3gpp.org/ftp/Meetings_3GPP_SYNC/RAN1/Docs/ [retrieved on Oct. 8, 2017] pp. 1-4, pp. 12-13.

International Search Report and Written Opinion—PCT/US2019/027259—ISA/EPO—dated Jun. 5, 2019.

Qualcomm Incorporated: "URLLC/eMBB Downlink Dynamic Multiplexing Schemes", 3GPP Draft; R1-1700827, 3rd Generation Partnership Project (3GPP), Mobile Competence Centre; 650, Route Des Lucioles; F-06921 Sophia-Antipolis Cedex; France vol. RAN WG1, No. Spokane, WA; Jan. 16, 2017-Jan. 20, 2017, Jan. 16, 2017 (Jan. 16, 2017), 7 Pages, XP051208346, Retrieved from the Internet: URL: http://www.3gpp.org/ftp/Meetings_3GPP_SYNC/RAN1/Docs/[retrieved on Jan. 16, 2017].

SEQUANS: "Considerations for UL Multiplexing with Different Reliability Requirements," 3GPP Draft; R1-1805158-UL Multiplexing, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 6, 2018, XP051413438, 5 Pages, Retrieved from the Internet: URL: http://www.3gpp.org/ftp/tsg%5Fran/WG1%5FRL1/TSGR1%5F92b/Docs/ [retrieved on Apr. 6, 2018].

CATT: "Remaining Aspects of Pre-Emption Indication", 3GPP Draft; R1-1720207, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017, XP051369843, Retrieved from the Internet: URL:http://www.3gpp.org/ftp/tsg%5Fran/WG1%5FRL1/TSGR1%5F91/Docs/[retrieved on Nov. 18, 2017], 7 pages.

Qualcomm Incorporated: "URLLC DL Pre-Emption and UL Suspension Indication Channel Design", 3GPP Draft, 3GPP TSG RAN WG1 NR Ad-Hoc #3, R1-1716434, URLLC DL Pre-Emption and UL Suspension Indication Channel Design, 3rd Generation Partnership Project (3GPP), Mobile Competence Centre 650, Route Des Lucioles, F-06921 Sophia, vol. RAN WG1, No. Nagoya, Japan, Sep. 18, 2017-Sep. 21, 2017, Sep. 17, 2017 (Sep. 17, 2017), XP051339889, pp. 1-9, Retrieved from the Internet: URL:http://www.3gpp.org/ftp/Meetings_3GPP_SYNC/RAN1/Docs/ [retrieved on Sep. 17, 2017] paragraph [0002]—paragraph [0004] paragraph [0001].

* cited by examiner

PREEMPTION INDICATION FOR LOW LATENCY COMMUNICATIONS ON DYNAMICALLY ALLOCATED RESOURCES

CROSS REFERENCE

The present Application for Patent claims the benefit of U.S. Provisional Patent Application No. 62/657,657 by FAKOORIAN, et al., entitled "Preemption Indication For Low Latency Communications on Dynamically Allocated Resources," filed Apr. 13, 2018, assigned to the assignee hereof, and expressly incorporated by reference herein.

BACKGROUND

The following relates generally to wireless communication and more specifically to a preemption indication (PI) for low latency communications on dynamically allocated resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support different types of communications between base stations and UEs, including mobile broadband (MBB) communications and low latency communications. Conventional techniques for supporting the coexistence of such different types of communications may be deficient.

SUMMARY

Some wireless communications systems may support different types of communications between base stations and user equipment (UEs), such as mobile broadband (MBB) communications and low latency communications. Low latency communications may be associated with bursty and unpredictable transmissions. As described herein, to facilitate low latency communications and limit the latency associated with waiting on appropriate resources for transmitting low latency data, a base station may schedule downlink low latency transmissions on uplink resources or uplink low latency transmissions on downlink resources (e.g., in addition to scheduling uplink low latency transmissions on uplink resources and downlink low latency transmissions on downlink resources). Further, to limit the latency associated with scheduling low latency communications, a base station may be configured with a carrier for transmitting preemption indications (PIs) to one or more UEs to reassign resources for low latency communications. Similarly, in some cases, a UE may be configured with a carrier to transmit scheduling requests (SRs) to request resources for low latency communications.

A method for wireless communication at a UE is described. The method may include identifying that a transmission time interval (TTI) is allocated for a first type of communications in a first carrier, receiving, in a second carrier, a control message indicating that a portion of the TTI is assigned for a second type of communications in a downlink or uplink direction in the first carrier, determining that the second type of communications is to preempt the first type of communications in the portion of the TTI based at least in part on receiving the control message, and communicating during the TTI based at least in part on receiving the control message and on the determination.

An apparatus for wireless communication at a UE is described. The apparatus may include means for identifying that a TTI is allocated for a first type of communications in a first carrier, means for receiving, in a second carrier, a control message indicating that a portion of the TTI is assigned for a second type of communications in a downlink or uplink direction in the first carrier, means for determining that the second type of communications is to preempt the first type of communications in the portion of the TTI based at least in part on receiving the control message, and means for communicating during the TTI based at least in part on receiving the control message and on the determination.

Another apparatus for wireless communication at a UE is described. The apparatus may include a processor, memory in electronic communication with the processor, and instructions stored in the memory. The instructions may be operable to cause the processor to identify that a TTI is allocated for a first type of communications in a first carrier, receive, in a second carrier, a control message indicating that a portion of the TTI is assigned for a second type of communications in a downlink or uplink direction in the first carrier, determine that the second type of communications is to preempt the first type of communications in the portion of the TTI based at least in part on receiving the control message, and communicate during the TTI based at least in part on receiving the control message and on the determination.

A non-transitory computer-readable medium for wireless communication at a UE is described. The non-transitory computer-readable medium may include instructions operable to cause a processor to identify that a TTI is allocated for a first type of communications in a first carrier, receive, in a second carrier, a control message indicating that a portion of the TTI is assigned for a second type of communications in a downlink or uplink direction in the first carrier, determine that the second type of communications is to preempt the first type of communications in the portion of the TTI based at least in part on receiving the control message, and communicate during the TTI based at least in part on receiving the control message and on the determination.

In some examples of the method, apparatus, and non-transitory computer-readable medium described above, the UE may be operating in an ultra-reliable low latency mode, and communicating during the TTI based at least in part on receiving the control message and on the determination includes receiving low latency downlink signals or transmitting low latency uplink signals during the portion of the TTI based at least in part on receiving the control message and on the determination. In some examples of the method, apparatus, and non-transitory computer-readable medium described above, the UE may be operating in an MBB mode, and communicating during the TTI based at least in part on receiving the control message and on the determination includes canceling an MBB uplink transmission during the portion of the TTI based at least in part on receiving the control message and on the determination.

In some examples of the method, apparatus, and non-transitory computer-readable medium described above, the UE may be operating in an ultra-reliable low latency mode, and communicating during the TTI based at least in part on receiving the control message and on the determination includes receiving low latency downlink signals transmitted during the portion of the TTI with a first transmit power or transmitting low latency uplink signals during the portion of the TTI with the first transmit power, the first transmit power being greater than a second transmit power used by the UE or another UE operating in a MBB mode to transmit MBB uplink signals during the portion of the TTI. In some examples of the method, apparatus, and non-transitory computer-readable medium described above, the UE may be operating in a MBB mode, and communicating during the TTI based at least in part on receiving the control message and on the determination includes transmitting MBB uplink signals during the portion of the TTI with a first transmit power, the first transmit power being lower than a second transmit power used by a base station to transmit low latency downlink signals during the portion of the TTI to the UE or another UE operating in an ultra-reliable low latency mode or the second transmit power used by the UE or another UE to transmit low latency uplink signals during the portion of the TTI to the base station.

Some examples of the method, apparatus, and non-transitory computer-readable medium described above may further include processes, features, means, or instructions for monitoring the second carrier during control message monitoring occasions for the control message. In some examples of the method, apparatus, and non-transitory computer-readable medium described above, the control message monitoring occasions may be periodic, and a periodicity of the control message monitoring occasions may be configured via radio resource control (RRC) signaling.

Some examples of the method, apparatus, and non-transitory computer-readable medium described above may further include processes, features, means, or instructions for monitoring the first carrier during control message monitoring occasions for the control message when the control message monitoring occasions coincide with downlink symbols of the first carrier and monitoring the second carrier during control message monitoring occasions for the control message when the control message monitoring occasions coincide with uplink symbols of the first carrier. In some examples of the method, apparatus, and non-transitory computer-readable medium described above, the control message monitoring occasions may be periodic, and a periodicity of the control message monitoring occasions may be configured via RRC signaling.

In some examples of the method, apparatus, and non-transitory computer-readable medium described above, the control message further indicates the resources of the first carrier that may be assigned for the second type of communications. Some examples of the method, apparatus, and non-transitory computer-readable medium described above may further include processes, features, means, or instructions for receiving a second control message in the first carrier that indicates the resources of the first carrier that may be assigned for the second type of communications. In some examples of the method, apparatus, and non-transitory computer-readable medium described above, the second control message may be received in a physical downlink control channel (PDCCH).

Some examples of the method, apparatus, and non-transitory computer-readable medium described above may further include processes, features, means, or instructions for receiving a slot format indication (SFI) indicating that the TTI may be configured for communications in the downlink or uplink direction, where a downlink direction configuration indicated by the control message overrides an uplink direction configuration indicated by the SFI during the portion of the TTI. In some examples of the method, apparatus, and non-transitory computer-readable medium described above, the first carrier includes a wideband carrier, and the second carrier includes a narrowband carrier, and the UE is configured to monitor the narrowband carrier for control messages indicating that resources of the first carrier are allocated for the second type of communications.

In some examples of the method, apparatus, and non-transitory computer-readable medium described above, the first carrier includes a first time division duplex (TDD) carrier, and the second carrier includes a second TDD carrier. In some examples of the method, apparatus, and non-transitory computer-readable medium described above, the control message includes a PI. In some examples of the method, apparatus, and non-transitory computer-readable medium described above, the first type of communications includes MBB communications and the second type of communications includes ultra-reliable low latency communications. Some examples of the method, apparatus, and non-transitory computer-readable medium described above may further include processes, features, means, or instructions for transmitting, in the first carrier or in the second carrier, an SR to request resources on which to transmit uplink signals associated with the second type of communications in the first carrier, wherein the control message indicating that the portion of the TTI is assigned for the second type of communications in the uplink direction in the first carrier is received based at least in part on transmitting the SR.

A method for wireless communication at a base station is described. The method may include identifying that a TTI is allocated for a first type of communications with a first UE in a first carrier, identifying downlink signals associated with a second type of communications to transmit to a second UE in the first carrier or that uplink signals associated with the second type of communications are to be received from the second UE in the first carrier, transmitting, in a second carrier, a control message indicating that a portion of the TTI is assigned for transmitting the downlink signals associated with the second type of communications or receiving the uplink signals associated with the second type of communications in the first carrier, determining that the second type of communications is to preempt the first type of communications in the portion of the TTI based at least in part on transmitting the control message, and communicating during the TTI based at least in part on transmitting the control message and on the determination.

An apparatus for wireless communication at a base station is described. The apparatus may include means for identifying that a TTI is allocated for a first type of communications with a first UE in a first carrier, means for identifying downlink signals associated with a second type of communications to transmit to a second UE in the first carrier or that uplink signals associated with the second type of communications are to be received from the second UE in the first carrier, means for transmitting, in a second carrier, a control message indicating that a portion of the TTI is assigned for transmitting the downlink signals associated with the second type of communications or receiving the uplink signals associated with the second type of communications in the first carrier, means for determining that the second type of communications is to preempt the first type of communications in the portion of the TTI based at least in part on transmitting the control message, and means for communicating during the TTI based at least in part on transmitting the control message and on the determination.

Another apparatus for wireless communication at a base station is described. The apparatus may include a processor, memory in electronic communication with the processor, and instructions stored in the memory. The instructions may be operable to cause the processor to identify that a TTI is allocated for a first type of communications with a first UE in a first carrier, identify downlink signals associated with a second type of communications to transmit to a second UE in the first carrier or that uplink signals associated with the second type of communications are to be received from the second UE in the first carrier, transmit, in a second carrier, a control message indicating that a portion of the TTI is assigned for transmitting the downlink signals associated with the second type of communications or receiving the uplink signals associated with the second type of communications in the first carrier, determine that the second type of communications is to preempt the first type of communications in the portion of the TTI based at least in part on transmitting the control message, and communicate during the TTI based at least in part on transmitting the control message and on the determination.

A non-transitory computer-readable medium for wireless communication at a base station is described. The non-transitory computer-readable medium may include instructions operable to cause a processor to identify that a TTI is allocated for a first type of communications with a first UE in a first carrier, identify downlink signals associated with a second type of communications to transmit to a second UE in the first carrier or that uplink signals associated with the second type of communications are to be received from the second UE in the first carrier, transmit, in a second carrier, a control message indicating that a portion of the TTI is assigned for transmitting the downlink signals associated with the second type of communications or receiving the uplink signals associated with the second type of communications in the first carrier, determine that the second type of communications is to preempt the first type of communications in the portion of the TTI based at least in part on transmitting the control message, and communicate during the TTI based at least in part on transmitting the control message and on the determination.

In some examples of the method, apparatus, and non-transitory computer-readable medium described above, communicating during the TTI based at least in part on transmitting the control message and on the determination includes transmitting the downlink signals associated with the second type of communications to the second UE or receiving the uplink signals associated with the second type of communications from the second UE during the portion of the TTI based at least in part on transmitting the control message and on the determination. In some examples of the method, apparatus, and non-transitory computer-readable medium described above, communicating during the TTI based at least in part on transmitting the control message and on the determination includes determining that an uplink transmission from the first UE during the portion of the TTI may be canceled based at least in part on transmitting the control message and avoiding monitoring for the uplink transmission based at least in part on determining that the uplink transmission may be canceled.

In some examples of the method, apparatus, and non-transitory computer-readable medium described above, communicating during the TTI based at least in part on transmitting the control message and on the determination includes receiving other uplink signals associated with the second type of communications transmitted by the first UE with a first transmit power during the portion of the TTI based at least in part on transmitting the control message. Some examples of the method, apparatus, and non-transitory computer-readable medium described above may further include processes, features, means, or instructions for transmitting the downlink signals associated with the second type of communications to the second UE during the portion of the TTI with a second transmit power or receiving the uplink signals associated with the second type of communications from the second UE during the portion of the TTI with the second transmit power based at least in part on transmitting the control message, the second transmit power being greater than the first transmit power.

In some examples of the method, apparatus, and non-transitory computer-readable medium described above, the control message may be transmitted in one of a plurality of control message monitoring occasions in the first carrier or the second carrier. In some examples of the method, apparatus, and non-transitory computer-readable medium described above, the control message further indicates the resources of the first carrier that may be assigned for transmitting the downlink signals associated with the second type of communications or receiving the uplink signals associated with the second type of communications. Some examples of the method, apparatus, and non-transitory computer-readable medium described above may further include processes, features, means, or instructions for transmitting a second control message in the first carrier that indicates the resources of the first carrier that may be assigned for transmitting the downlink signals associated with the second type of communications or receiving the uplink signals associated with the second type of communications. In some examples of the method, apparatus, and non-transitory computer-readable medium described above, the second control message may be transmitted in a physical downlink control channel (PDCCH).

Some examples of the method, apparatus, and non-transitory computer-readable medium described above may further include processes, features, means, or instructions for transmitting an SFI indicating that the TTI may be configured for communications in the downlink or uplink direction, where a downlink direction configuration indicated by the control message overrides an uplink direction configuration indicated by the SFI during the portion of the TTI. In some examples of the method, apparatus, and non-transitory computer-readable medium described above, the first UE may be configured to operate in an MBB mode and the first type of communications includes MBB communications. In some examples of the method, apparatus, and non-transitory computer-readable medium described above, the second UE may be configured to operate in an ultra-reliable low latency mode and the second type of communications includes ultra-reliable low latency communications.

A method for wireless communication at a UE is described. The method may include identifying that a TTI configured for communications in a downlink direction is allocated for a first type of communications in a first carrier, identifying uplink signals associated with a second type of communications to transmit in the first carrier, transmitting, in the first carrier or in a second carrier, an SR to request resources on which to transmit the uplink signals in the first carrier, receiving a control message indicating that a portion of the TTI is assigned for transmitting the uplink signals associated with the second type of communications, determining that the portion of the TTI is configured for communications in an uplink direction based at least in part on receiving the control message, and transmitting the uplink signals in the portion of the TTI based at least in part on receiving the control message and on the determination.

An apparatus for wireless communication at a UE is described. The apparatus may include means for identifying that a TTI configured for communications in a downlink direction is allocated for a first type of communications in a first carrier, means for identifying uplink signals associated with a second type of communications to transmit in the first carrier, means for transmitting, in the first carrier or in a second carrier, an SR to request resources on which to transmit the uplink signals in the first carrier, means for receiving a control message indicating that a portion of the TTI is assigned for transmitting the uplink signals associated with the second type of communications, means for determining that the portion of the TTI is configured for communications in an uplink direction based at least in part on receiving the control message, and means for transmitting the uplink signals in the portion of the TTI based at least in part on receiving the control message and on the determination.

Another apparatus for wireless communication at a UE is described. The apparatus may include a processor, memory in electronic communication with the processor, and instructions stored in the memory. The instructions may be operable to cause the processor to identify that a TTI configured for communications in a downlink direction is allocated for a first type of communications in a first carrier, identify uplink signals associated with a second type of communications to transmit in the first carrier, transmit, in the first carrier or in a second carrier, an SR to request resources on which to transmit the uplink signals in the first carrier, receive a control message indicating that a portion of the TTI is assigned for transmitting the uplink signals associated with the second type of communications, determine that the portion of the TTI is configured for communications in an uplink direction based at least in part on receiving the control message, and transmit the uplink signals in the portion of the TTI based at least in part on receiving the control message and on the determination.

A non-transitory computer-readable medium for wireless communication at a UE is described. The non-transitory computer-readable medium may include instructions operable to cause a processor to identify that a TTI configured for communications in a downlink direction is allocated for a first type of communications in a first carrier, identify uplink signals associated with a second type of communications to transmit in the first carrier, transmit, in the first carrier or in a second carrier, an SR to request resources on which to transmit the uplink signals in the first carrier, receive a control message indicating that a portion of the TTI is assigned for transmitting the uplink signals associated with the second type of communications, determine that the portion of the TTI is configured for communications in an uplink direction based at least in part on receiving the control message, and transmit the uplink signals in the portion of the TTI based at least in part on receiving the control message and on the determination.

In some examples of the method, apparatus, and non-transitory computer-readable medium described above, transmitting the SR in the first carrier or in the second carrier includes transmitting the SR in an SR monitoring occasion of the first carrier or the second carrier. In some examples of the method, apparatus, and non-transitory computer-readable medium described above, transmitting the SR in the SR monitoring occasion of the first carrier or the second carrier includes transmitting the SR in an SR monitoring occasion of the first carrier when the SR monitoring occasion coincides with uplink symbols of the first carrier and transmitting the SR in an SR monitoring occasion of the second carrier when the SR monitoring occasion coincides with downlink symbols of the first carrier.

In some examples of the method, apparatus, and non-transitory computer-readable medium described above, transmitting the SR in the first carrier or in the second carrier includes transmitting the SR in an SR monitoring occasion of the first carrier, the SR monitoring occasion coinciding with uplink symbols or downlink symbols of the first carrier. In some examples of the method, apparatus, and non-transitory computer-readable medium described above, transmitting the SR in the first carrier or in the second carrier includes transmitting the SR in an SR monitoring occasion of the second carrier.

In some examples of the method, apparatus, and non-transitory computer-readable medium described above, the control message further indicates the resources of the first carrier that may be assigned for transmitting the uplink signals. In some examples of the method, apparatus, and non-transitory computer-readable medium described above, the first carrier includes a wideband carrier, and the second carrier includes a narrowband carrier. In some examples of the method, apparatus, and non-transitory computer-readable medium described above, the first carrier includes a first TDD carrier, and the second carrier includes a second TDD carrier. In some examples of the method, apparatus, and non-transitory computer-readable medium described above, the control message includes downlink control information (DCI) received in a PDCCH in the first carrier. In some examples of the method, apparatus, and non-transitory computer-readable medium described above, the first type of communications includes MBB communications and the second type of communications includes ultra-reliable low latency communications.

A method for wireless communication at a base station is described. The method may include identifying that a TTI configured for communications in a downlink direction is allocated for a first type of communications in a first carrier, receiving, in the first carrier or in a second carrier, an SR from a UE requesting resources on which to transmit uplink signals in the first carrier, transmitting a control message indicating that a portion of the TTI is assigned for transmitting the uplink signals associated with the second type of communications, determining that the portion of the TTI is configured for communications in an uplink direction based at least in part on transmitting the control message, and receiving the uplink signals from the UE in the portion of the TTI based at least in part on transmitting the control message and on the determination.

An apparatus for wireless communication at a base station is described. The apparatus may include means for identifying that a TTI configured for communications in a downlink direction is allocated for a first type of communications in a first carrier, means for receiving, in the first carrier or in a second carrier, an SR from a UE requesting resources on which to transmit uplink signals in the first carrier, means for transmitting a control message indicating that a portion of the TTI is assigned for transmitting the uplink signals associated with the second type of communications, means for determining that the portion of the TTI is configured for communications in an uplink direction based at least in part on transmitting the control message, and means for receiving the uplink signals from the UE in the portion of the TTI based at least in part on transmitting the control message and on the determination.

Another apparatus for wireless communication at a base station is described. The apparatus may include a processor, memory in electronic communication with the processor, and instructions stored in the memory. The instructions may be operable to cause the processor to identify that a TTI configured for communications in a downlink direction is allocated for a first type of communications in a first carrier, receive, in the first carrier or in a second carrier, an SR from a UE requesting resources on which to transmit uplink signals in the first carrier, transmit a control message indicating that a portion of the TTI is assigned for transmitting the uplink signals associated with the second type of communications, determine that the portion of the TTI is configured for communications in an uplink direction based at least in part on transmitting the control message, and receive the uplink signals from the UE in the portion of the TTI based at least in part on transmitting the control message and on the determination.

A non-transitory computer-readable medium for wireless communication at a base station is described. The non-transitory computer-readable medium may include instructions operable to cause a processor to identify that a TTI configured for communications in a downlink direction is allocated for a first type of communications in a first carrier, receive, in the first carrier or in a second carrier, an SR from a UE requesting resources on which to transmit uplink signals in the first carrier, transmit a control message indicating that a portion of the TTI is assigned for transmitting the uplink signals associated with the second type of communications, determine that the portion of the TTI is configured for communications in an uplink direction based at least in part on transmitting the control message, and receive the uplink signals from the UE in the portion of the TTI based at least in part on transmitting the control message and on the determination.

In some examples of the method, apparatus, and non-transitory computer-readable medium described above, receiving the SR in the first carrier or in the second carrier includes receiving the SR in an SR monitoring occasion of the first carrier or the second carrier. In some examples of the method, apparatus, and non-transitory computer-readable medium described above, receiving the SR in the SR monitoring occasion of the first carrier or the second carrier includes receiving the SR in an SR monitoring occasion of the first carrier when the SR monitoring occasion coincides with uplink symbols of the first carrier and receiving the SR in an SR monitoring occasion of the second carrier when the SR monitoring occasion coincides with downlink symbols of the first carrier.

In some examples of the method, apparatus, and non-transitory computer-readable medium described above, receiving the SR in the first carrier or in the second carrier includes receiving the SR in an SR monitoring occasion of the first carrier, the SR monitoring occasion coinciding with uplink symbols or downlink symbols of the first carrier. In some examples of the method, apparatus, and non-transitory computer-readable medium described above, receiving the SR in the first carrier or in the second carrier includes receiving the SR in an SR monitoring occasion of the second carrier. In some examples of the method, apparatus, and non-transitory computer-readable medium described above, the control message further indicates the resources of the first carrier that may be assigned to the UE for transmitting the uplink signals.

DETAILED DESCRIPTION

Figure 1:
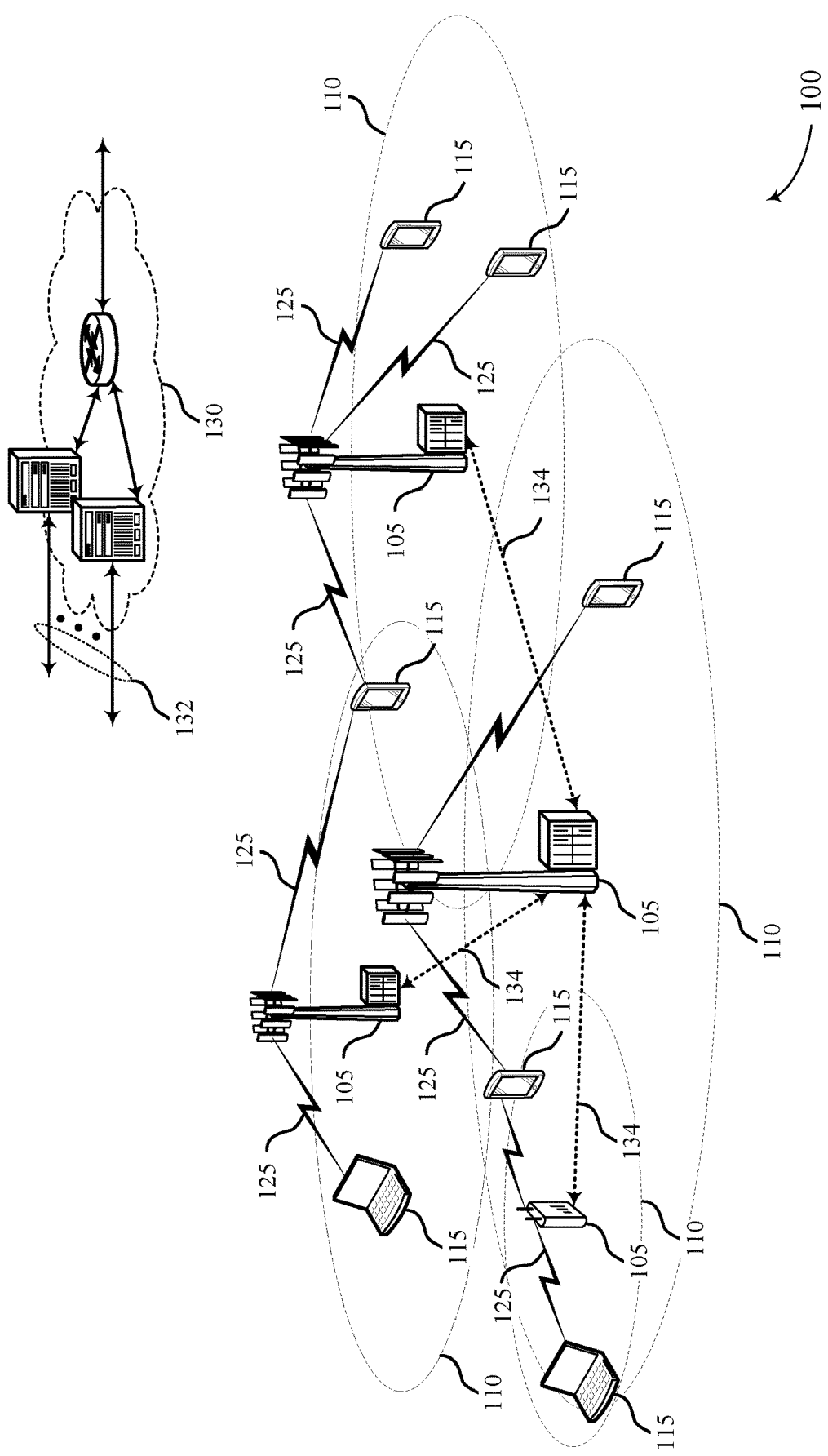
FIGS. 1 and 2 illustrate examples of wireless communications systems that support preemption indications (PI) for low latency communications on dynamically allocated resources in accordance with aspects of the present disclosure.

Some wireless communications systems may support mobile broadband (MBB) communications and low latency communications. Low latency communications may be associated with bursty and unpredictable transmissions. To facilitate such communications, a base station may identify resources originally allocated for MBB communications, and the base station may reassign these resources for low latency communications (e.g., using puncturing). In such cases, the base station may indicate the reassigned resources (or punctured resources) to the UE whose resources have been reassigned and to the UE scheduled for the low latency communications.

In some instances, however, a base station may identify downlink low latency data to transmit to a UE when downlink resources are unavailable, or a UE may identify uplink low latency data to transmit to a base station when uplink resources are unavailable. Accordingly, in conventional systems, the base station may have to wait until downlink resources are available to transmit the downlink low latency data, or the UE may have to wait until uplink resources are available to transmit the uplink low latency data. As a result, the base station or UE may experience additional latency which may be unacceptable for certain low latency applications.

As described herein, a wireless communications system may support efficient techniques for limiting the latency associated with waiting for appropriate resources for low latency data transmissions. In particular, a base station may be configured to transmit low latency data on resources originally configured for uplink communications, or a UE may be configured to transmit low latency data on resources originally configured for downlink communications. That is, resources originally configured for communications in a particular link direction may be reconfigured for communications in a different link direction for low latency communications.

Further, the wireless communications system may support efficient techniques for limiting the latency associated with scheduling a low latency data transmission. Specifically, a base station may be configured with a carrier available for transmitting preemption indications (PIs) to one or more UEs to reassign resources for low latency communications (e.g., when downlink resources are unavailable on another carrier used for MBB communications). Similarly, a UE may be configured with a carrier available for transmitting scheduling requests (SRs) to one or more UEs to request resources for low latency communications (e.g., when uplink resources are unavailable on another carrier used for MBB communications).

Aspects of the disclosure introduced above are described below in the context of a wireless communications system. Examples of processes and signaling exchanges that support a PI for low latency communications on dynamically allocated resources are then described. Aspects of the disclosure are further illustrated by and described with reference to apparatus diagrams, system diagrams, and flowcharts that relate to a PI for low latency communications on dynamically allocated resources.

FIG. 1 illustrates an example of a wireless communications system 100 that supports PIs for low latency communications on dynamically allocated resources in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, ultra-reliable low latency communications (URLLCs), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)) or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may support techniques for dynamically configuring resources for uplink communication or downlink communication between a base station 105 and a UE 115 to improve the flexibility of the system. For example, a base station 105 may configure a slot as an uplink slot (i.e., to be used for uplink communication), a downlink slot (i.e., to be used for downlink communication), or a flexible slot (i.e., to be used for either uplink or downlink communications). In this example, the base station 105 may transmit an SFI to a UE 115 to indicate the configuration of the slot, and the UE 115 may receive the SFI and determine the configuration of the slot prior to communicating in the slot. Although the examples described herein are related to a base station 105 using an SFI to indicate the link direction configuration of a slot (i.e., whether a slot is configured as an uplink slot, downlink slot, or a flexible slot), it is to be understood that the same techniques may be applied when using any indication to indicate the configuration of any set of symbols.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or mini-slots).

Wireless communications system 100 may support different types of communications between base stations 105 and UEs 115. For example, wireless communications system 100 may support URLLC and MBB communications between base stations 105 and UEs 115. In some cases, there may be different types of URLLC in wireless communications system 100 associated with different latency constraints and different reliability requirements. As an example, a first type of URLLC may be associated with a latency less than 10 ms and a reliability or block error rate (BLER) of $1\text{-}10^{-9}$, and a second type of URLLC may be associated with a latency between 10 ms and 50 ms and a reliability or BLER between $1\text{-}10^{-6}$ and $1\text{-}10^{-9}$. Further, in some aspects, wireless communications system may support repetition-based transmissions (or retransmissions) of data (e.g., a transport block) to improve the chances that the data is received by a receiving device. In such aspects, in time division duplex (TDD) deployments, when consecutive uplink TTIs or downlink TTIs are unavailable, a transmitting device may transmit the data repeatedly in non-consecutive TTIs (e.g., since traffic may not be transmitted unless a TTI with an appropriate link direction configuration is available).

In some cases, in order to facilitate the different types of communications mentioned above in a wireless communications system, a base station 105 may semi-statically allocate resources for the different types of communications, and these different types of communications may be multiplexed over time and frequency resources. For example, the base station 105 may semi-statically allocate resources for low latency communications and MBB communications. However, because low latency communications may be unpredictable, it may be challenging for a base station to allocate an appropriate amount of resources for low latency communications with a UE 115. For example, if the base station allocates a small amount of resources for low latency communications, there may not be sufficient resources available for communication when data traffic is high. Alternatively, if a base station allocates a large amount of resources for low latency communications, resources may be unused when data traffic is low. Accordingly, rather than semi-statically allocating resources for low latency communication, a base station 105 may interrupt MBB communications (e.g., using puncturing) to accommodate bursty low latency communications.

Thus, low latency communications and MBB communications may be multiplexed in the time domain using puncturing. In such cases, it may be appropriate for the base station 105 to indicate the resources reassigned (or punctured) for low latency communications to a UE 115 operating in a low latency mode (i.e., a low latency UE 115) and a UE 115 operating in an MBB mode (i.e., an MBB UE 115). Specifically, the base station 105 may transmit a PI to the low latency UE 115 and the MBB UE 115 (e.g., in group-common downlink control information (GC-DCI)) to inform the UEs 115 of the punctured resources. The low latency UE 115 may receive the PI and may communicate with a base station 105 on the reassigned (or punctured) resources, and the MBB UE 115 may also receive the indication and may, in some examples, refrain from communicating with the base station 105 on the punctured resources. In addition, for uplink low latency communications, a UE may transmit an SR to request resources for an uplink low latency data transmission, and the UE may receive a grant allocating resources for the uplink low latency data transmission.

The above techniques may allow a base station 105 to transmit a PI on downlink resources to a low latency UE 115 and an MBB UE 115 to reassign resources for low latency communications. Further, the above techniques may allow a UE 115 to transmit an SR on uplink resources to request resources for low latency communications. In some cases, however, a base station 105 may not have access to downlink resources for transmitting the PI or a UE 115 may not have access to uplink resources for transmitting the SR (e.g., in a TDD deployment where resources (e.g., slots) are configured for uplink communications or downlink communications dynamically). Further, the base station 105 may not have access to downlink resources for a low latency downlink data transmission or the UE 115 may not have access to uplink resources for a low latency uplink data transmission. Accordingly, the base station 105 or UE 115 may have to wait for the next available downlink or uplink resources before scheduling low latency communications and before transmitting low latency data, resulting in increased latency in a wireless communications system which may be unacceptable for certain low latency applications. Wireless communications system 100 may support efficient techniques for accommodating bursty low latency traffic to satisfy the latency constraints of various low latency applications.

Figure 2:
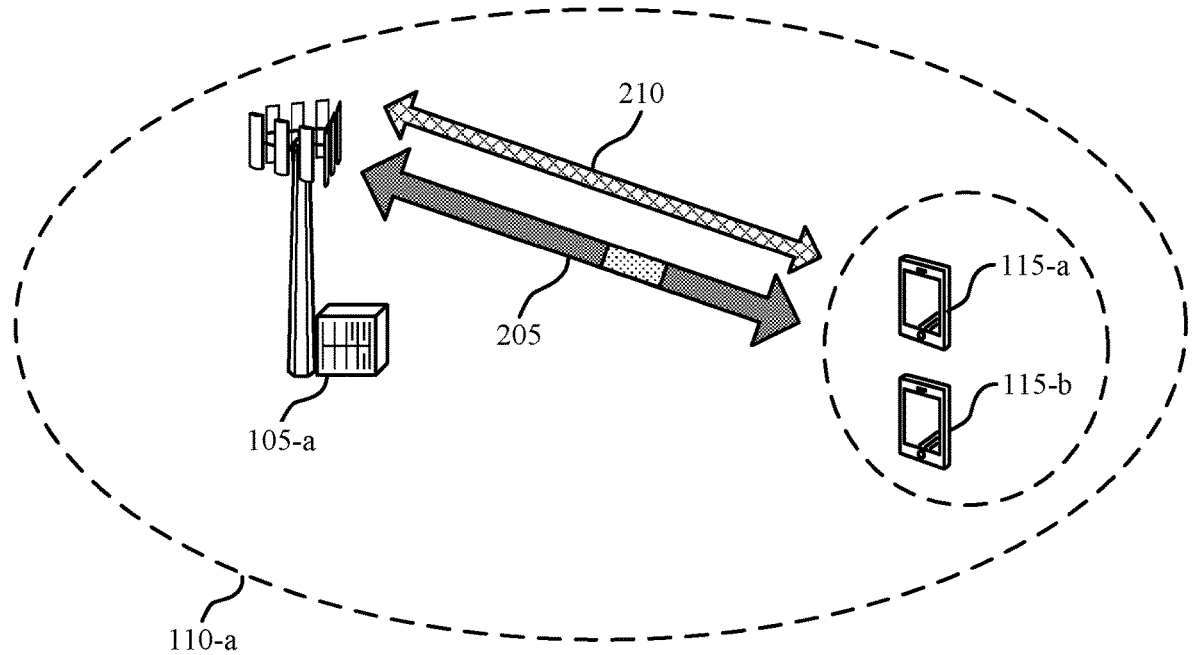
Figure 2:
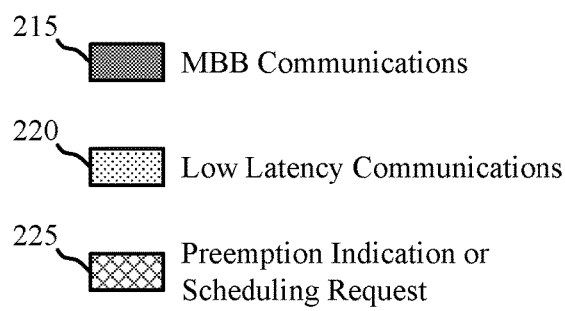

FIG. 2 illustrates an example of a wireless communications system 200 that supports PIs for low latency communications on dynamically allocated resources in accordance with various aspects of the present disclosure. Wireless communications system 200 includes base station 105-a, which may be an example of a base station 105 described with reference to FIG. 1. Wireless communications system 200 also includes UE 115-a and UE 115-b, which may be examples of a UE 115 described with reference to FIG. 1. Base station 105-a may provide communication coverage for a respective coverage area 110-a, which may be an example of a coverage area 110 described with reference to FIG. 1. In the present example, UE 115-a may operate in an MBB mode and may be referred to as an MBB UE 115-a, and UE 115-b may operate in a low latency mode and may be referred to as a low latency UE 115-b. Although the present example describes communication between a base station and two UEs, it is to be understood that the techniques described herein are applicable to a single UE capable of operating in an MBB mode and a low latency mode.

Wireless communications system 200 may implement aspects of wireless communications system 100. For instance, wireless communications system 200 may support different types of communications between base station 105-a and UEs 115 in coverage area 110-a, including MBB communications 215 between base station 105-a and MBB UE 115-a over carrier 205 and low latency communications 220 between base station 105-a and low latency UE 115-b over carrier 205. As described with reference to FIG. 1, low latency communications 220 may be bursty and unpredictable. Accordingly, when base station 105-a or low latency UE 115-a identifies low latency data to transmit, base station 105-a may reassign resources, originally allocated for MBB communications 215, for low latency communications 220 (e.g., using puncturing). In some cases, however, if low latency downlink data is identified for transmission when downlink resources are unavailable or if low latency uplink data is identified for transmission when uplink resources are unavailable, base station 105-a may have to wait until the appropriate resources are available to schedule a low latency transmission, resulting in increased latency. In such cases, in order to limit the latency associated with waiting for appropriate resources for a low latency transmission, base station 105-a may use the techniques described herein for scheduling low latency transmissions.

In particular, for downlink low latency communications, base station 105-a may be configured to use a carrier 210 (e.g., exclusively or in addition to carrier 205) to transmit a PI 225 to MBB UE 115-a and low latency UE 115-b. As such, even if base station 105-a identifies low latency downlink data to transmit to UE 115-b when downlink resources are unavailable on carrier 205, base station 105-a may have access to resources on which to transmit the PI 225 to MBB UE 115-a and low latency UE 115-b. Further, as described herein, the PI may override any previous configuration of a set of resources (e.g., a slot or a portion of a slot) to be used for a low latency downlink transmission such that base station 105-a may be able to transmit the low latency downlink data to UE 115-b with limited latency. For example, the PI 225 may indicate that a slot or a portion of a slot previously configured for uplink communications (e.g., by an SFI) is to be used for the downlink low latency transmission, and, based on the PI 225, MBB UE 115-a and low latency UE 115-b may determine that the slot or the portion of the slot is reconfigured for downlink communications and may communicate during the slot accordingly. Further examples of preempting uplink MBB communications for downlink low latency communications are described with reference to FIGS. 3 and 4.

In addition, for uplink low latency communications, low latency UE 115-b may be configured to use carrier 210 or carrier 205 to transmit an SR 225 to base station 105-a to request resources for the uplink low latency transmission. Base station 105-a may receive the SR and may grant resources to low latency UE 115-b for the uplink low latency transmission. Similar to the techniques described above for a downlink low latency transmission, the grant transmitted by base station 105-a may override any previous configuration of a set of resources to be used for a low latency uplink transmission such that UE 115-b may be able to transmit the low latency uplink data to base station 105-a with limited latency. For example, the grant may indicate that a slot or a portion of a slot previously configured for downlink communications (e.g., by an SFI) is to be used for an uplink low latency transmission, and, based on the grant, low latency UE 115-*b* may determine that the slot or the portion of the slot is reconfigured for uplink communications and may communicate during the slot accordingly. Further examples of preempting downlink MBB communications for uplink low latency communications are described with reference to FIGS. 5A and 5B.

Figure 3A:
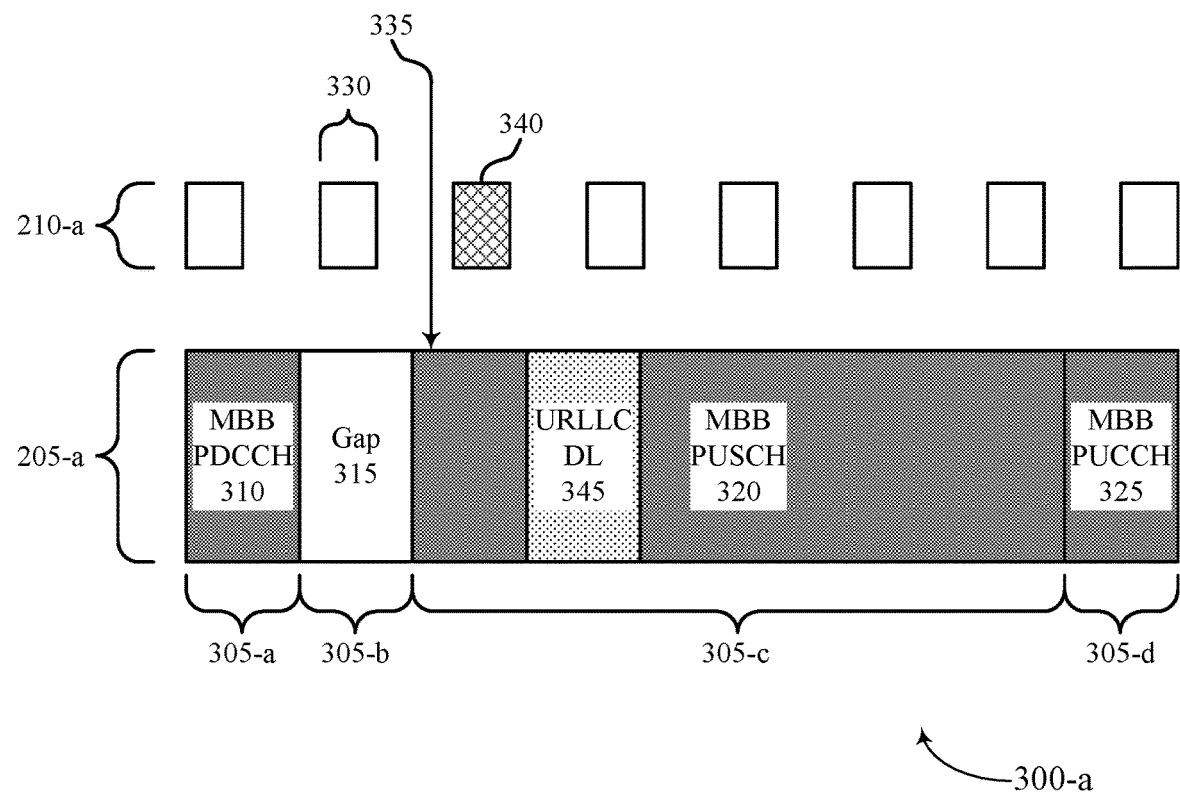
FIGS. 3A and 3B illustrate examples of mobile broadband (MBB) and low latency communications multiplexing in an uplink centric slot in accordance with aspects of the present disclosure.
Figure 3B:
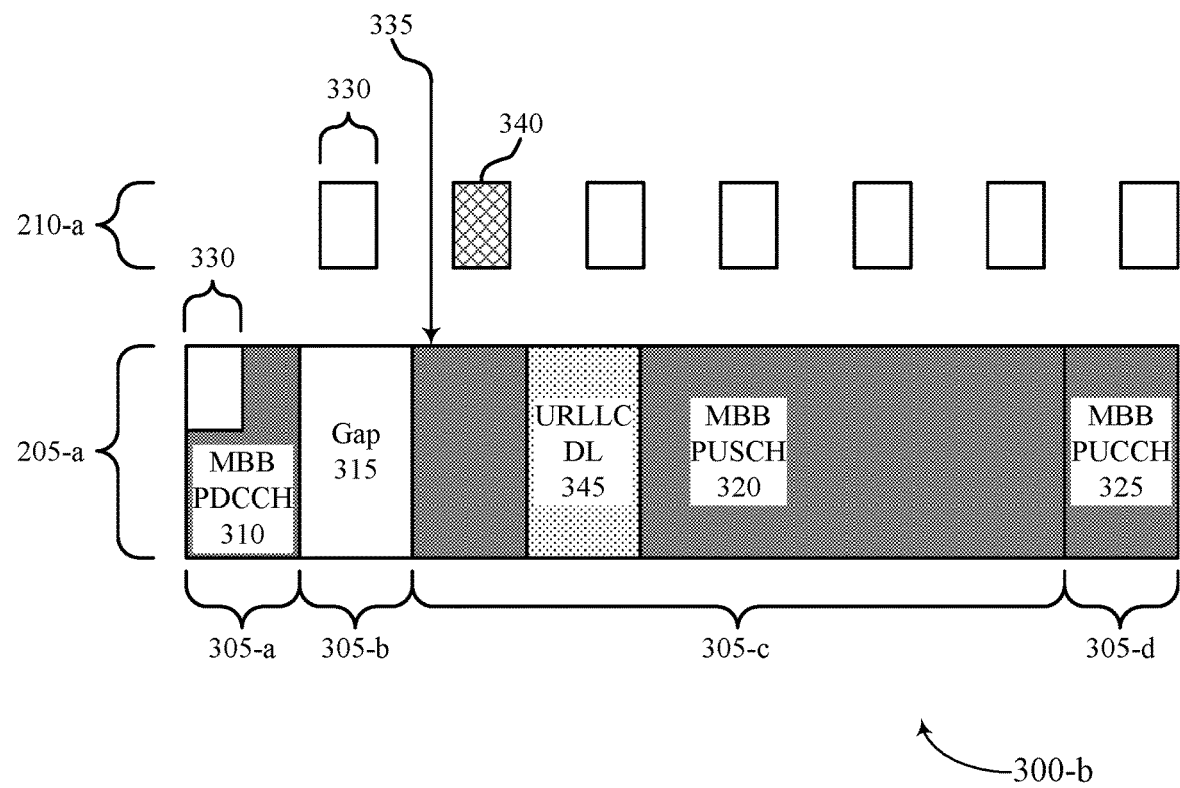

FIGS. 3A and 3B illustrate examples of MBB and low latency communication multiplexing in an uplink centric slot 300 in accordance with various aspects of the present disclosure. In the examples of FIGS. 3A and 3B, a base station 105 may communicate with an MBB UE 115 during an uplink centric slot 300 on resources of a carrier 205-*a*. For instance, the base station 105 may be scheduled to transmit downlink control information 310 in symbol 305-*a* of slot 300, and, after a gap or guard period 315 during symbol 305-*b*, the MBB UE 115 may be scheduled to transmit uplink data 320 in symbols 305-*c* of slot 300 and uplink control information 325 in symbol 305-*d* of slot 300. While communicating with MBB UE 115 during slot 300, the base station 105 may identify (e.g., at 335) low latency data to transmit to a low latency UE 115. Thus, as described herein, the base station 105 may transmit a PI 340 to reassign a portion of the uplink centric slot 300 for a transmission of the low latency downlink data.

The PI may be transmitted in PI monitoring occasions 330 in a carrier 210-*a* different from the carrier 205-*a* used for MBB communications and low latency communications between the base station 105 and UEs 115. Alternatively, the PI may be transmitted in PI monitoring occasions in carrier 205-*a* or carrier 210-*a*. The PI monitoring occasions 330 may correspond to sets of resources available to the base station 105 for transmitting PIs to UEs 115, where the sets of resources may be monitored by UEs 115. In the example of FIG. 3A (e.g., with slot 300-*a*), the PI monitoring occasions 330 may be exclusively on carrier 210-*a*. However, in the example of FIG. 3B, the PI monitoring occasions 330 may be on carrier 210-*a* or carrier 205-*a*. For instance, the PI monitoring occasions 330 may be on carrier 210-*a* when the PI monitoring occasions 330 coincide with uplink symbols in slot 300-*b* (as illustrated by the first PI monitoring occasion 330), and the PI monitoring occasions 330 may be on carrier 205-*a* when the PI monitoring occasions 330 coincide with downlink symbols in slot 300-*b*.

Additionally, the carrier 210-*a* configured to be used for PI transmissions may also have certain characteristics to limit overhead in a wireless communications system. For example, carrier 210-*a* may be a narrowband carrier and carrier 205 may be a wideband carrier. In some cases, carrier 210-*a* may be a frequency division duplex (FDD) downlink carrier that may provide a consistent downlink opportunity for the base station 105 to transmit PIs to UEs 115. In other cases, carrier 210-*a* may be a TDD carrier that may provide downlink opportunities for the base station 105 to transmit PIs to UEs 115 during uplink symbols on carrier 205 and may provide uplink opportunities for UEs 115 during downlink symbols on carrier 205 (i.e., carrier 210-*a* may complement carrier 205-*a*). In any case, as discussed above, once the base station 105 identifies downlink low latency data to transmit, the base station 105 may transmit a PI in a subsequent PI monitoring occasion (e.g., either on carrier 205-*a* or carrier 210-*a*).

Once the MBB UE 115 receives the PI, the MBB UE 115 may determine that the portion of the slot reassigned for low latency communications (e.g., identified based on the PI or based on the PI and a more detailed PI, as discussed with reference to FIGS. 4A and 4B), is reconfigured for downlink communications (e.g., after being previously configured for uplink communications via an SFI). Similarly, once the low latency UE 115 receives the PI, the low latency UE 115 may determine that the portion of the slot reassigned for low latency communications (e.g., identified based on the PI and on low latency control information received on carrier 205-*a*, as discussed with reference to FIGS. 4A and 4B) is reconfigured for downlink communications (e.g., after being previously configured for uplink communications via an SFI).

Accordingly, in some cases, the MBB UE 115 may cancel an uplink transmission during the portion of the slot 300 reassigned for the low latency downlink data transmission 345 (e.g., release the resources reassigned for the low latency downlink data transmission 345 or puncture the coded bits on the resources reassigned for the low latency downlink data transmission 345), and the low latency UE 115 may monitor for the low latency downlink data during the portion of the slot. In other cases, the MBB UE 115 may use a reduced power for an uplink transmission during the portion of the slot 300 reassigned for the low latency downlink data transmission 345 (e.g., relative to a power used for MBB transmissions in other portions of the slot 300), and the base station 105 may use an increased power (or boosted power) for the low latency downlink data transmission 345 in the portion of the slot 300 (e.g., relative to a power used for MBB transmissions in other portions of the slot 300).

In some aspects, the MBB UE 115 or low latency UE 115 may avoid monitoring for PIs in PI monitoring occasions if the remaining number of uplink symbols in an uplink slot on carrier 205-*a* (i.e., after the low latency data is identified for transmission) is less than a threshold number of symbols (e.g., four symbols). The threshold number of symbols may correspond to the amount of time that would be used by the low latency UE 115 to process a PI and decode low latency control information for a low latency data transmission (i.e., the processing timeline based on a capability of the low latency UE 115). Thus, if a PI monitoring occasion is within a last few uplink symbols of an uplink slot on carrier 205-*a*, the low latency UE 115 or MBB UE 115 may determine that any PI received during these symbols would not be able to schedule a downlink low latency data transmission in the uplink slot (i.e., because of the processing timeline). As such, the low latency UE 115 or MBB UE 115 may avoid monitoring for a PI in the PI monitoring occasion.

Further, in some cases, instead of monitoring for the PI and canceling an uplink transmission on the reassigned resources or reducing the power used to transmit on reassigned resources, an MBB UE 115 may be configured to avoid monitoring for PIs from a base station. In such cases, the MBB UE 115 may be able to save power and processing time (i.e., due to limited complexity at the MBB UE 115). However, an uplink transmission from the MBB UE 115 to a base station 105 may interfere with a downlink low latency transmission (e.g., a best effort transmission) from the base station 105 to a low latency UE 115 on the same resources. In addition, since the MBB UE 115 may not be able to identify which resources are impacted by the downlink low latency transmission in a TTI, all the code blocks transmitted by the MBB UE 115 during the TTI may have to be retransmitted. Further, if a PI is intended for the MBB UE 115, the MBB UE 115 may fail to receive the downlink low latency transmission for which the PI was transmitted, which may result in high latency and reduced reliability.

Accordingly, in order to limit the inefficiencies associated with not monitoring for PIs, the base station 105 may configure the MBB UE 115 to avoid monitoring for PIs when the MBB UE 115 is far away from a low latency UE 115 for which the downlink low latency transmission is intended. Otherwise, the MBB UE 115 may be configured to monitor for PIs from the base station 105. As such, interference between uplink transmissions from the MBB UE 115 and downlink low latency transmissions to low latency UEs 115 may be limited, since the MBB UE 115 may cancel an uplink transmission or reduce the power of an uplink transmission on resources reassigned for a downlink low latency transmission to a low latency UE 115 when the low latency UE 115 is close to the MBB UE 115.

The examples described above are related to using a PI to inform an MBB UE 115 and a low latency UE 115 of an upcoming low latency downlink transmission (or upcoming low latency uplink transmission). In some cases, however, it may be appropriate for a base station 105 to indicate the specific resources being reassigned for a downlink low latency transmission to a low latency UE 115. Various techniques for indicating the specific resources being reassigned for a downlink low latency transmission (or uplink low latency transmission) to a low latency UE 115 are described below with reference to FIGS. 4A and 4B.

Figure 4A:
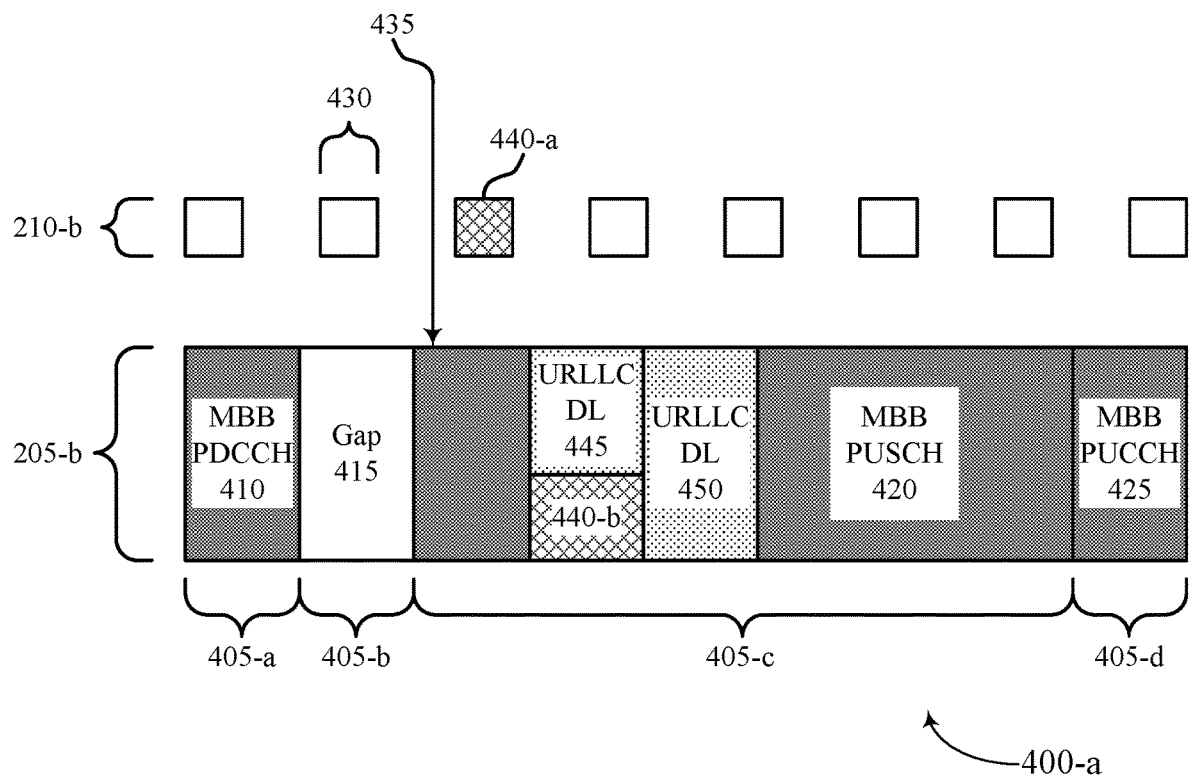
FIGS. 4A and 4B illustrate examples of MBB and low latency communications multiplexing in an uplink centric slot in accordance with aspects of the present disclosure.
Figure 4B:
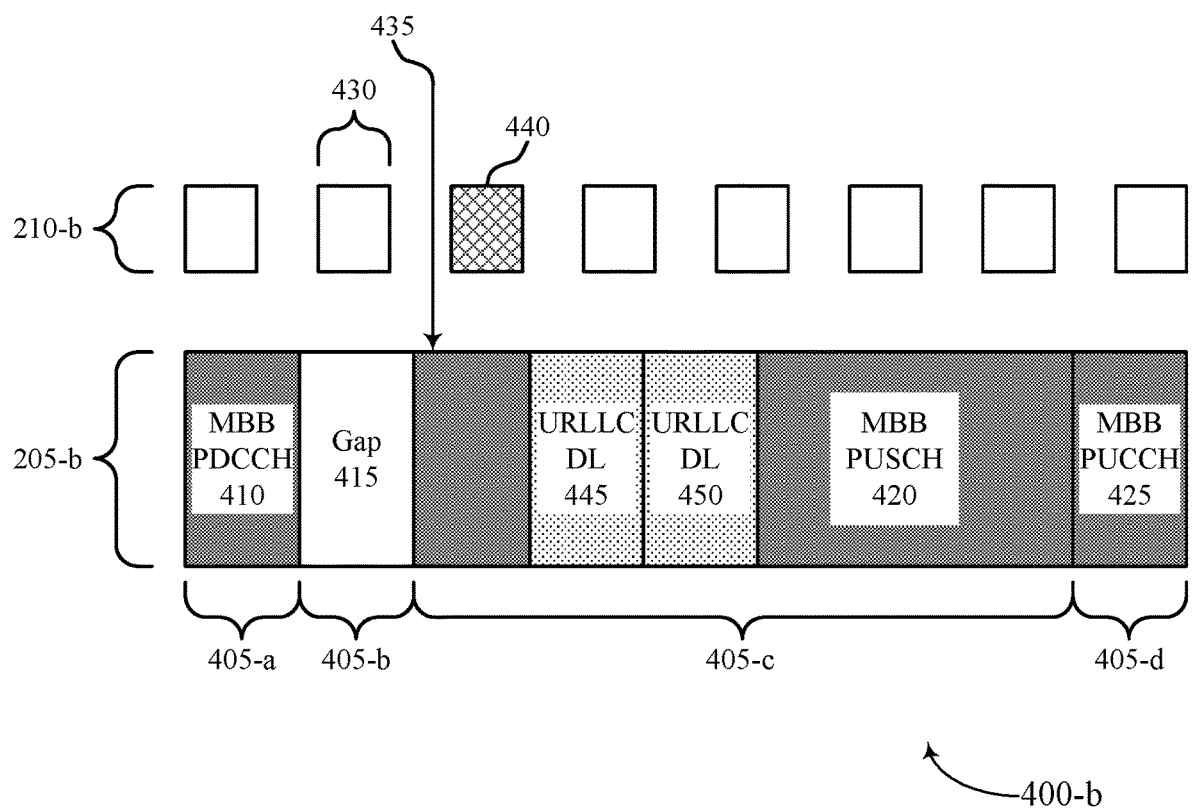

FIGS. 4A and 4B illustrate examples of MBB and low latency communications multiplexing in an uplink centric slot 400 in accordance with various aspects of the present disclosure. In the examples of FIGS. 4A and 4B, a base station 105 may communicate with an MBB UE 115 during an uplink centric slot 400 on resources of a carrier 205-b. For instance, the base station 105 may be scheduled to transmit downlink control information 410 in symbol 405-a of slot 400, and, after a gap or guard period 415 during symbol 405-b, the MBB UE 115 may be scheduled to transmit uplink data 420 in symbols 405-c of slot 400 and uplink control information 425 in symbol 405-d of slot 400. While communicating with MBB UE 115 during slot 400, the base station 105 may identify (e.g., at 435) low latency data to transmit to a low latency UE 115. Thus, as described herein, the base station 105 may transmit a PI 440 (during PI monitoring occasions 430) to reassign a portion of the uplink centric slot 400 for a transmission of the low latency downlink data.

In the example of FIG. 4A, the base station 105 may transmit a first PI 440-a to indicate that resources of uplink centric slot 400-a are reassigned for the low latency downlink data transmission. For instance, the base station 105 may transmit a single bit indicating whether resources are reassigned (or whether the link direction of resources is switched) for a low latency downlink data transmission. However, the first PI 440-a may not indicate the specific resources reassigned for the low latency downlink data transmission. Accordingly, the base station 105 may transmit a second, detailed PI 440-b on carrier 205-b to indicate the specific resources reassigned for the low latency downlink data transmission. The detailed PI 440-b may include a bitmap that indicates the specific resources reassigned for the low latency downlink data transmission and may be transmitted along with low latency downlink control information 445.

Thus, after an MBB UE 115 receives the PI 440-a on carrier 210-b, the MBB UE 115 may monitor carrier 205-b for the detailed PI 440-b to identify the specific resources that are reassigned. And after a low latency UE 115 receives the PI 440-a on carrier 210-b, the low latency UE 115 may monitor carrier 205-b for low latency downlink control information 445 to identify the specific resources that are reassigned (e.g., since low latency downlink control information 445 may be more reliable than the detailed PI 440-b). The MBB UE 115 may then cancel an uplink transmission on the reassigned resources or may transmit the uplink transmission on the reassigned resources with reduced power, and the low latency UE may receive the low latency downlink data transmission 450 on the reassigned resources. In some aspects, if a monitoring occasion to be used to transmit a PI 440-a is on resources of carrier 205-b (e.g., if the monitoring occasion coincides with downlink symbols on carrier 205-b), base station 105 may transmit a single PI 440 that identifies the resources reassigned for the low latency downlink data transmission.

In the example of FIG. 4B, the base station 105 may transmit a single PI 440 to indicate that resources of uplink centric slot 400-b are reassigned for a low latency downlink data transmission and to indicate which resources are reassigned for the low latency downlink data transmission. The single PI 440 may include a bitmap that indicates the specific resources reassigned for the low latency downlink data transmission. An MBB UE 115 may receive the single PI 440 and may identify the specific resources reassigned for the low latency downlink data transmission based on decoding the bitmap in the single PI 440. Alternatively, the low latency UE 115 may receive the single PI 440 and may identify the specific resources reassigned for the low latency downlink data transmission based on decoding the bitmap in the single PI 440 received on carrier 210-b and/or based on decoding a bitmap included in the low latency downlink control information 445 received on carrier 205-b that indicates the specific resources reassigned for the low latency downlink data transmission. In any case, once the MBB UE 115 and the low latency UE 115 identify the specific resources reassigned for the low latency downlink data transmission, the MBB UE 115 may cancel an uplink transmission on the reassigned resources or may transmit the uplink transmission on the reassigned resources with reduced power, and the low latency UE may receive the low latency downlink data transmission 450 on the reassigned resources.

Figure 5A:
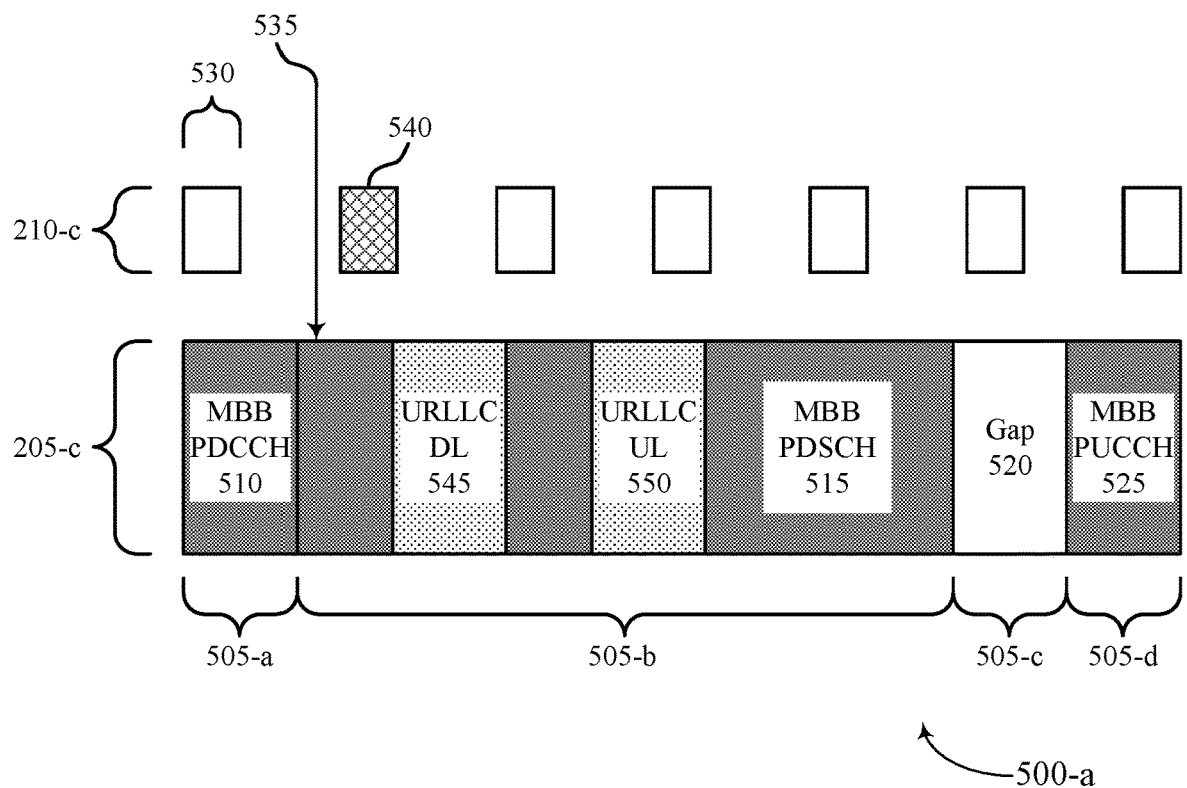
FIGS. 5A and 5B illustrate examples of MBB and low latency communications multiplexing in a downlink centric slot in accordance with aspects of the present disclosure.
Figure 5B:
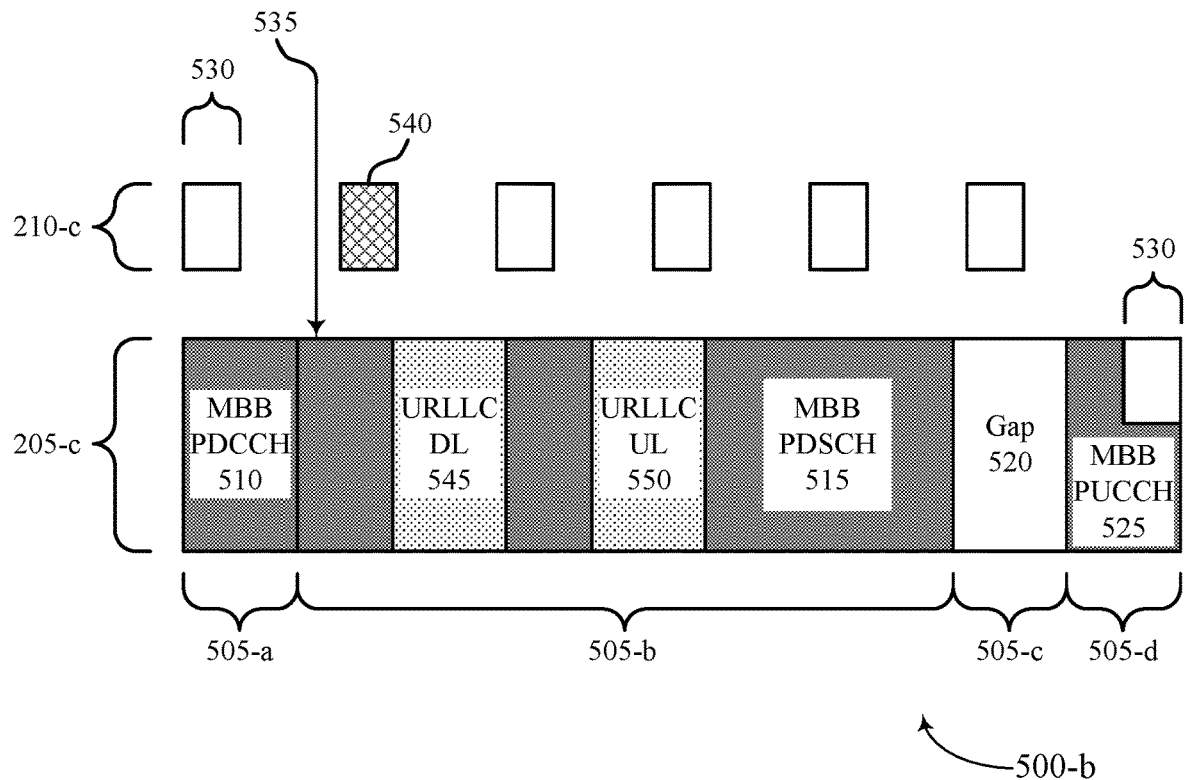

FIGS. 5A and 5B illustrate examples of MBB and low latency communications multiplexing in a downlink centric slot in accordance with various aspects of the present disclosure. In the examples of FIGS. 5A and 5B, a base station 105 may communicate with an MBB UE 115 during a downlink centric slot 500 on resources of a carrier 205-c. For instance, the base station 105 may be scheduled to transmit downlink control information 510 in symbol 505-a of slot 500 and downlink data 515 in symbols 505-b of slot 500. Subsequently, after a gap or guard period 520 during symbol 505-c, the MBB UE 115 may be scheduled to transmit uplink control information 525 in symbol 505-d of slot 500. While the base station 105 is communicating with MBB UE 115 during slot 500, a low latency UE 115 may identify (e.g., at 535) data to transmit to the base station 105. Thus, as described herein, the low latency UE 115 may transmit an SR 540 to request resources in which to transmit the low latency data to the base station 105.

The SR may be transmitted in SR monitoring occasions 530 in carrier 210-c or in carrier 205-c. The SR monitoring occasions may correspond to sets of resources available to the low latency UE 115 for transmitting SRs to a base station 105, where the sets of resources may be monitored by the base station 105. In the example of FIG. 5A (with slot 500-a), the SR monitoring occasions 530 may be exclusively on carrier 210-c. In the example of FIG. 5B, the SR monitoring occasions 530 may be on carrier 210-c or carrier 205-c. Specifically, the SR monitoring occasions 530 may be on carrier 210-c when the SR monitoring occasions 530 coincide with downlink symbols in slot 500-b (as illustrated by the first six SR monitoring occasions 530), and the SR monitoring occasions 530 may be on carrier 205-c when the SR monitoring occasions coincide with uplink symbols in slot 500-b (as illustrated by the last SR monitoring occasion coinciding with downlink symbol 505-d). In yet another example, the SR monitoring occasions 530 may be exclusively on carrier 205-c (e.g., regardless of whether the SR monitoring occasions 530 coincide with uplink or downlink symbols in slot 500).

Additionally, carrier 210-c configured to be used for SR transmissions may also have certain characteristics to limit the overhead in a wireless communications system. For example, carrier 210-c may be a narrowband carrier while carrier 205-c may be a wideband carrier. In some cases, carrier 210-c may be an FDD uplink carrier that may provide a consistent uplink opportunity for low latency UEs 115 to transmit SRs to a base station 105. In other cases, carrier 210-c may be a TDD carrier that may provide uplink opportunities for low latency UEs to transmit SRs to the base station 105 during downlink symbols on carrier 205-c and may provide downlink opportunities for the base station 105 during uplink symbols on carrier 205-c (i.e., carrier 210-c may complement carrier 205-c). In any case, as discussed above, once the low latency UE 115 identifies uplink low latency data to transmit, the low latency UE 115 may transmit a PI in a subsequent SR monitoring occasion (e.g., either on carrier 205-c or carrier 210-c).

Once the base station 105 receives the SR, the base station 105 may transmit a control message in low latency downlink control information 545 to schedule resources for the low latency UE 115 to use to transmit the uplink low latency data. For example, the base station 105 may schedule a portion of the slot 500 to the low latency UE 115 for the uplink low latency transmission. The base station 105 may also transmit a PI as discussed with reference to FIGS. 3 and 4. In this example, the low latency UE 115 may determine that the portion of the slot to be used for the transmission of the low latency uplink data is reconfigured for uplink communications (e.g., after previously being configured for downlink communications via an SFI). Accordingly, in some cases, the base station 105 may cancel a downlink transmission during the portion of the slot 500 reassigned for the low latency uplink data transmission 550 (e.g., release the resources reassigned for the low latency uplink data transmission 550), and the low latency UE 115 may transmit the low latency uplink transmission during the portion of the slot 500. In other cases, the base station 105 may use a reduced power for a downlink transmission during the portion of the slot 500 reassigned for the low latency uplink data transmission 550 (e.g., relative to a power used for MBB transmissions in other portions of the slot 500), and the low latency UE 115 may use an increased power for the low latency uplink data transmission in the portion of the slot 500 (e.g., relative to a power used for MBB transmissions in other portions of the slot 500.

Figure 6:
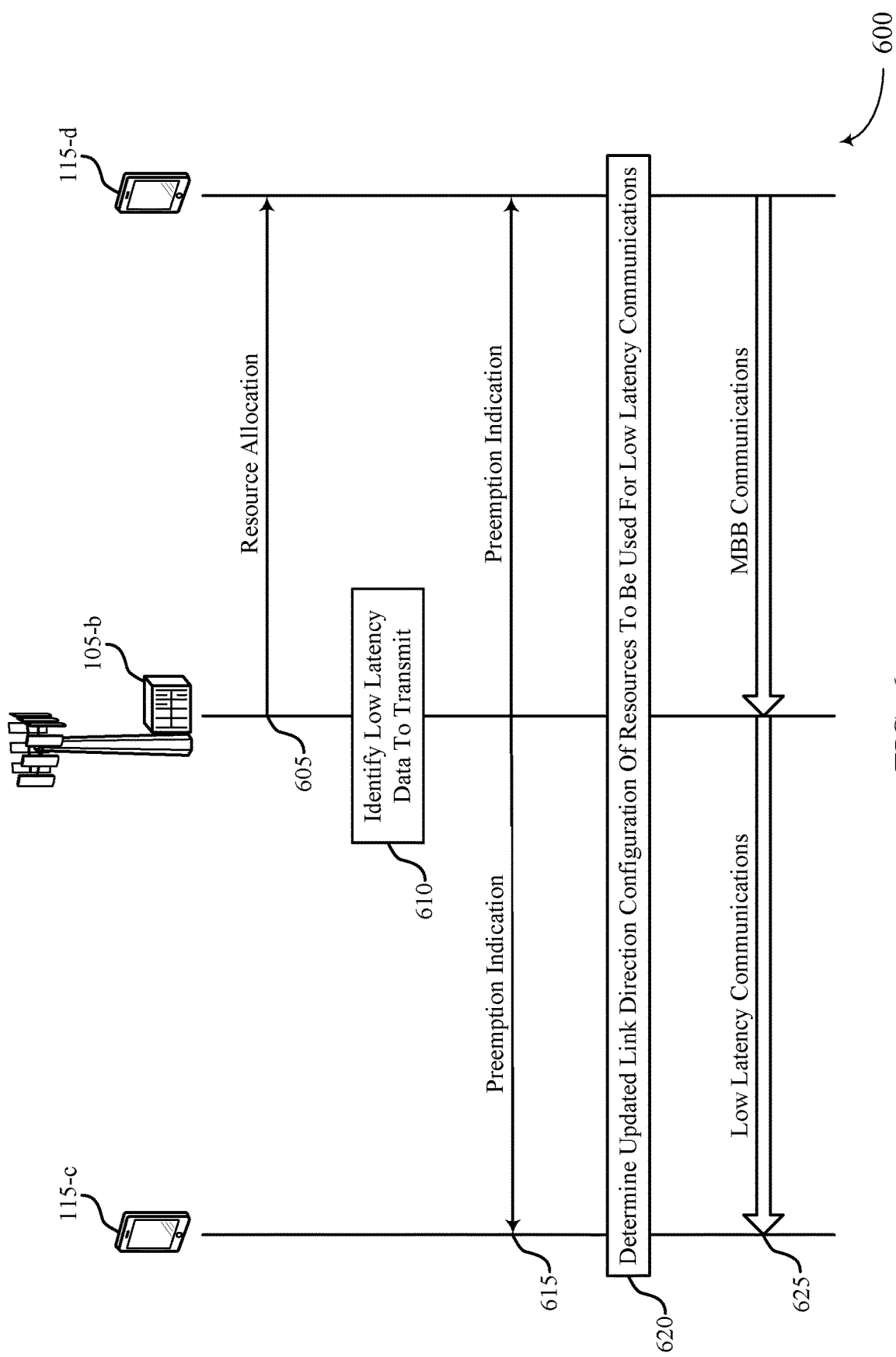
FIGS. 6 and 7 illustrate examples of process flows that support PIs for low latency communications on dynamically allocated resources in accordance with aspects of the present disclosure.

FIG. 6 illustrates an example of a process flow 600 that supports PIs for low latency communications on dynamically allocated resources in accordance with various aspects of the present disclosure. Process flow 600 illustrates aspects of techniques performed by a base station 105-b, which may be an example of a base station 105 described with reference to FIGS. 1-5. Process flow 600 also illustrates aspects of techniques performed by a UE 115-c and a UE 115-d, which may be examples of a UE 115 described with reference to FIGS. 1-5. UE 115-c may operate in a low latency mode and may be referred to as low latency UE 115-c, and UE 115-d may operate in an MBB mode and may be referred to as MBB UE 115-d.

At 605, base station 105-b may allocate resources for MBB communications with MBB UE 115-d in an uplink slot. For example, base station 105-b may transmit an uplink grant to allocate resources for an uplink transmission from MBB UE 115-d. At 610, base station 105-b may identify downlink low latency data to transmit to low latency UE 115-c. Thus, using the techniques described herein, at 615, base station 105-b may transmit a PI to low latency UE 115-c and MBB UE 115-d to indicate that resources of the uplink slot are reassigned for a downlink low latency data transmission. As discussed above with reference to FIGS. 3A and 3B, the PI may be transmitted in PI monitoring occasions on a same carrier used for MBB communications between base station 105-b and MBB UE 115-d or on a different carrier. In some cases, the PI monitoring occasions may be periodic (e.g., with an RRC configured periodicity) and may each span an sTTI (or mini-slot).

As discussed with reference to FIGS. 4A and 4B, MBB UE 115-d may then identify the resources to be used for low latency communications based on the PI received at 615 or based on a more detailed PI received after the PI received at 615. In addition, low latency UE 115-c may identify the resources to be used for low latency communications based on the PI received at 615 and low latency control information received from base station 105-b. Specifically, the PI, more detailed PI, or low latency control information may include a bitmap that indicates the specific resources to be used for the low latency communications. In some aspects, the bitmap may have a fixed payload size (e.g., 14 bits excluding cyclic redundancy check (CRC) bits). Further, the bitmap may refer to resources in the bandwidth part to be used for the low latency communications (i.e., active bandwidth part) and in the current slot. The time-frequency blocks within the current slot and the active bandwidth part may be partitioned with M time domain parts and N frequency domain parts (e.g., {M, N}={14, 1}, {7, 2}). In any case, at 620, once low latency UE 115-c and MBB UE 115-d identify the resources reassigned in a slot for low latency communications, the low latency UE 115-c and MBB UE 115-d may determine that the reassigned resources are reconfigured for downlink communications. At 625, low latency UE 115-c and MBB UE 115-d may then communicate during the slot accordingly.

In one example, the low latency UE 115-c may receive the downlink low latency data transmission on the reassigned resources, and MBB UE 115-d may cancel an uplink transmission on the reassigned resources. In some cases, MBB UE 115-d may then determine whether to resume or drop the remainder of the uplink transmission in remaining uplink symbols of a slot after the downlink low latency data transmission. For example, MBB UE 115-d may determine whether to resume or drop the remainder of the uplink transmission based on an availability of demodulation reference signals (DMRSs) in the remaining uplink symbols. That is, MBB UE 115-d may resume the uplink transmission in the remaining uplink symbols if DMRSs are available in these symbols. However, if no DMRSs are available in the remaining uplink symbols, MBB UE 115-d may drop the uplink transmission in the remaining uplink symbol.

Alternatively, base station 105-b may introduce additional DMRSs in the remaining uplink symbols if there are no DMRSs in the remaining uplink symbols (i.e., the uplink transmission in the remaining uplink symbols may be punctured by additional DMRSs). Further, MBB UE 115-d may also determine whether to resume or drop the remainder of the uplink transmission based on the number of remaining symbols in a slot. For instance, MBB UE 115-d may resume the uplink transmission in the remaining uplink symbols if there are a threshold number of remaining uplink symbols. However, if the number of remaining uplink symbols is less than the threshold number, MBB UE 115-d may drop the uplink transmission in the remaining uplink symbols.

In another example, base station 105-b may transmit the downlink low latency data transmission in the reassigned portion of the slot with an increased (or boosted) power (e.g., relative to the power used for MBB transmissions in other portions of the slot), and MBB UE 115-d may transmit the uplink transmission on the reassigned resources with a reduced power (e.g., relative to the power used for MBB transmissions in other portions of the slot). In this example, the amount of power reduction at the MBB UE 115-d for the uplink transmission may be RRC configured (e.g., −3 dB). Further, after adjusting to transmit with the reduced power, MBB UE 115-d, it may be appropriate for MBB UE 115-d to determine when to readjust its transmit power to an original transmit power.

In some cases, MBB UE 115-d may determine the specific resources used for the low latency communications, and MBB UE 115-d may readjust its transmit power after these resources. In other cases, however, MBB UE 115-d may not be able to identify the specific resources used for the low latency communications. Accordingly, MBB UE 115-d may continue monitoring PI monitoring occasions to determine when to readjust to an original transmit power. As such, if the MBB UE 115-d fails to receive a PI that indicates that low latency communications is ongoing or if the MBB UE 115-d receives an indication that the low latency communications has finished, the MBB UE 115-d may readjust to the original transmit power (i.e., increase its transmit power). By using an indication from base station 105-b, MBB UE 115-d may be able to determine when to readjust its transmit power with limited complexity. However, since UE 115-d may readjust its transmit power after receiving an indication (or failing to receive an indication), the UE 115-d may transmit code blocks using the reduced transmit power after low latency communications. Accordingly, the MBB UE 115-d may have to retransmit all code blocks to base station 105-b (i.e., since MBB UE 115-d may not be able to identify the affected code blocks).

Although aspects of the techniques described herein are related to transmitting a PI to reassign resources in an uplink slot for downlink low latency communications, it is to be understood that base station 105-b may transmit a PI using the same techniques to reassign resources in a downlink slot for downlink low latency communications, an uplink slot for uplink low latency communications, or a downlink slot for uplink low latency communications. Further, although aspects of the techniques described herein are related to MBB communications between a base station and a first UE and low latency communications between the base station and a second UE, it is to be understood that the same techniques may apply for supporting MBB communications and low latency communications with the same UE. In this case, if the same UE is scheduled to receive a low latency downlink transmission in an uplink slot, the UE may be configured with a gap or guard period to transition from transmitting on the uplink to receiving on the downlink.

Figure 7:
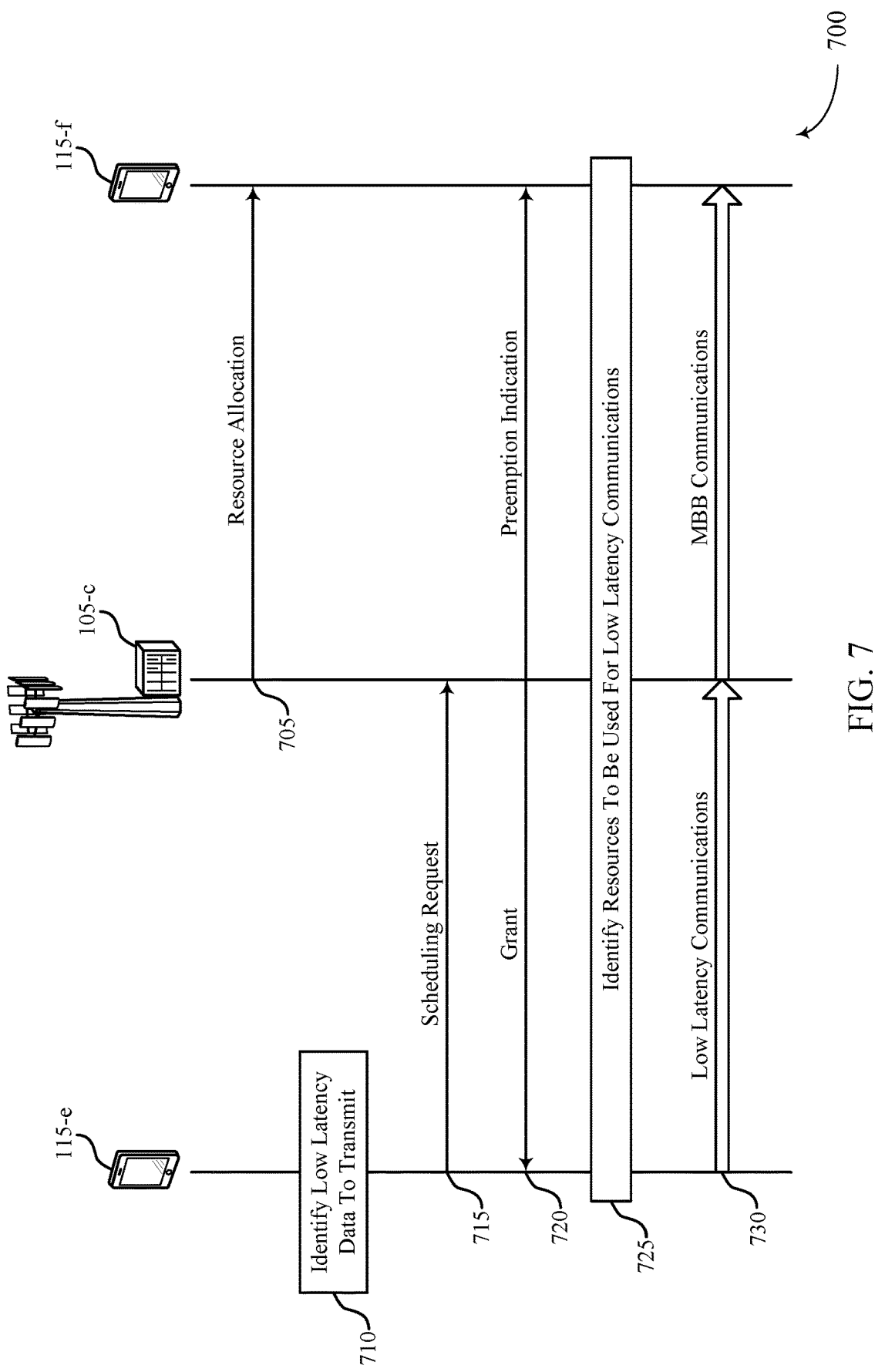

FIG. 7 illustrates an example of a process flow 700 that supports PIs for low latency communications on dynamically allocated resources in accordance with various aspects of the present disclosure. Process flow 700 illustrates aspects of techniques performed by a base station 105-c, which may be an example of a base station 105 described with reference to FIGS. 1-5. Process flow 700 also illustrates aspects of techniques performed by a UE 115-e and a UE 115-f, which may be examples of a UE 115 described with reference to FIGS. 1-5. UE 115-e may operate in a low latency mode and may be referred to as low latency UE 115-e, and UE 115-f may operate in an MBB mode and may be referred to as MBB UE 115-f.

At 705, base station 105-c may allocate resources for MBB communications with MBB UE 115-f in a downlink slot. For example, base station 105-c may transmit a downlink grant to allocate resources for a downlink transmission to MBB UE 115-f. At 710, low latency UE 115-e may identify low latency data to transmit to base station 105-c. Thus, using the techniques described herein, at 715, low latency UE 115-e may transmit a SR to base station 105-c to request resources for the uplink low latency data transmission. As discussed above with reference to FIGS. 5A and 5B, the SR may be transmitted in a SR monitoring occasion on a same carrier used for MBB communications between base station 105-c and UE 115-f or on a different carrier. In some cases, the SR monitoring occasions may be periodic (e.g., with an RRC configured periodicity) and may each span an sTTI (or mini-slot).

At 720, base station 105-c may then transmit a grant to low latency UE 115-e (e.g., in a low latency control channel) to allocate resources of a downlink slot for the uplink low latency data transmission. Base station 105-c may also transmit a PI to UE 115-f (e.g., in a group common DCI (GC-DCI)) to indicate that resources of the downlink slot are reassigned for the uplink low latency data transmission. Thus, at 725, low latency UE 115-e may identify the resources reassigned for the uplink low latency data transmission and may determine that the reassigned resources are reconfigured for uplink communications based on the grant. And MBB UE 115-f may identify the resources reassigned for the uplink low latency data transmission and may determine that the reassigned resources are reconfigured for uplink communications based on the PI.

At 730, base station 105-c may then communicate with low latency UE 115-e and MBB UE 115-f based on the resources in the downlink slot being reassigned for the uplink low latency data transmission. In one example, base station 105-c may receive the uplink low latency data transmission on the reassigned resources from low latency UE 115-e and may cancel a downlink transmission on the reassigned resources to MBB UE 115-f. In another example, base station 105-c may receive the uplink low latency data transmission transmitted on the reassigned resources with an increased (or boosted) power (e.g., relative to a power used for MBB transmissions on other resources of the downlink slot), and base station 105-c may transmit the downlink transmission on the reassigned resources to MBB UE 115-f with a reduced power (e.g., relative to a power used for MBB transmissions on other resources of the downlink slot).

Although aspects of the techniques described herein are related to transmitting a SR to request resources for an uplink low latency transmission in a downlink slot (e.g., and receiving a PI that preempts an MBB transmission for the uplink low latency transmission), it is to be understood that low latency UE 115-e may transmit a SR using the same techniques to request resources for an uplink low latency transmission in an uplink slot (e.g., and receive a PI that preempts an MBB transmission for the uplink low latency transmission using the same techniques). Further, although aspects of the techniques described herein are related to MBB communications between a base station and a first UE and low latency communications between the base station and a second UE, it is to be understood that the same techniques may apply for supporting MBB communications and low latency communications with the same UE. In this case, if the same UE is scheduled to transmit a low latency uplink transmission in a downlink slot, the UE may be configured with a gap or guard period to transition from receiving on the downlink to transmitting on the uplink.

Figure 8:
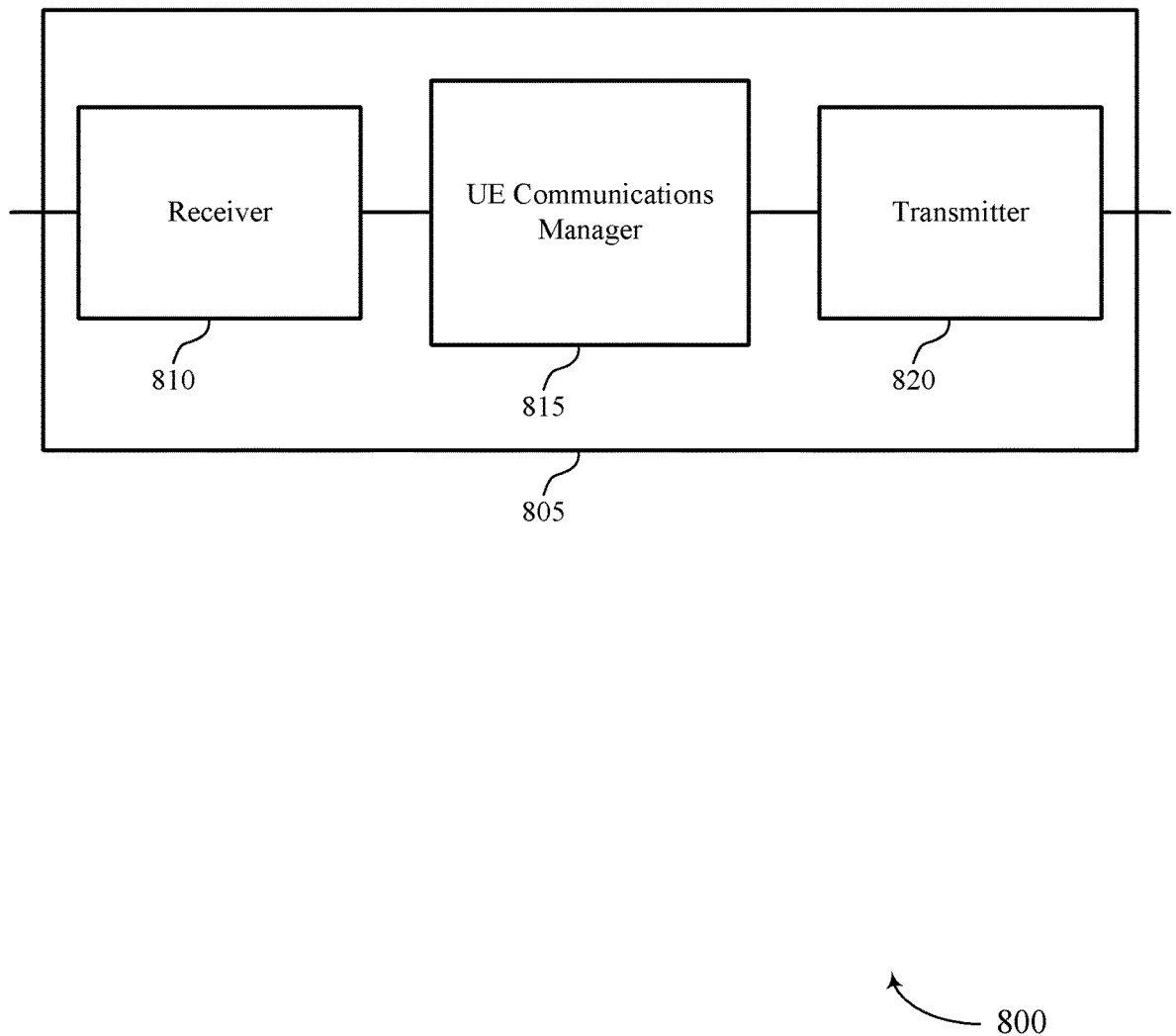
FIGS. 8-10 show block diagrams of a device that supports PIs for low latency communications on dynamically allocated resources in accordance with aspects of the present disclosure.

FIG. 8 shows a block diagram 800 of a wireless device 805 that supports PI for low latency communications on dynamically allocated resources in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to PI for low latency communications on dynamically allocated resources, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may identify that a TTI is allocated for a first type of communications in a first carrier, receive, in a second carrier, a control message indicating that a portion of the TTI is assigned for a second type of communications in a or uplink downlink direction in the first carrier, determine that the second type of communications is to preempt the first type of communications in the portion of the TTI based at least in part on receiving the control message, and communicate during the TTI based on receiving the control message and on the determination. In some cases, the first type of communications includes MBB communications and the second type of communications includes ultra-reliable low latency communications.

The UE communications manager 815 may also identify that a TTI configured for communications in a downlink direction is allocated for a first type of communications in a first carrier, identify uplink signals associated with a second type of communications to transmit in the first carrier, transmit, in the first carrier or in a second carrier, an SR to request resources on which to transmit the uplink signals in the first carrier, receive a control message indicating that a portion of the TTI is assigned for transmitting the uplink signals associated with the second type of communications, determine that the portion of the TTI is configured for communications in an uplink direction based on receiving the control message, and transmit the uplink signals in the portion of the TTI based on receiving the control message and on the determination.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
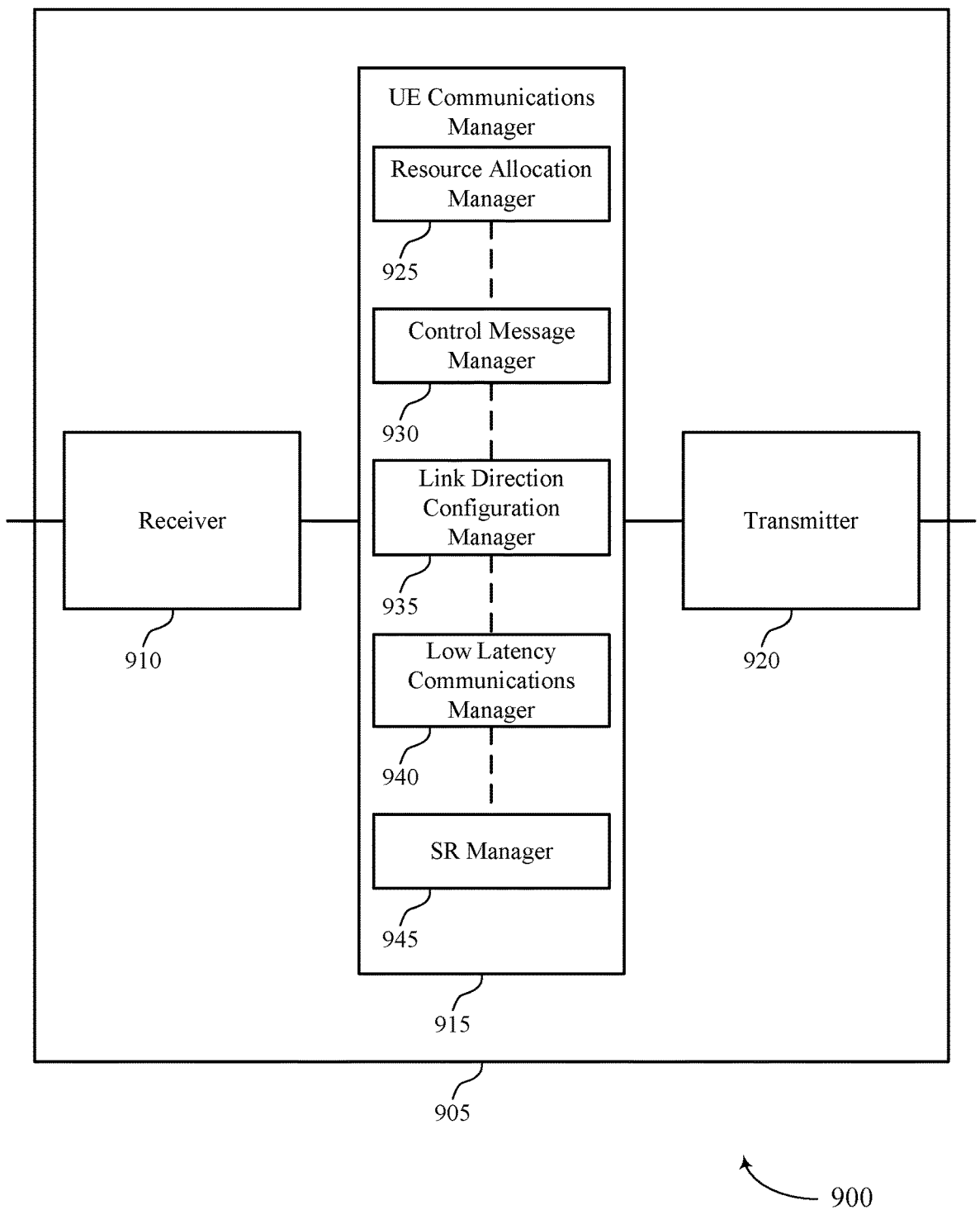

FIG. 9 shows a block diagram 900 of a wireless device 905 that supports PI for low latency communications on dynamically allocated resources in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. UE communications manager 915 may be an example of aspects of the UE communications manager 1115 described with reference to FIG. 11. UE communications manager 915 may include resource allocation manager 925, control message manager 930, link direction configuration manager 935, low latency communications manager 940, and SR manager 945. Wireless device 905 may also include a processor. Each of these components may be in communication with one another (e.g., via one or more buses).

Receiver 910 may receive information such as packets, user data, or control information associated with various information channels (e.g., control channels, data channels, and information related to PI for low latency communications on dynamically allocated resources, etc.). Information may be passed on to other components of the device. The receiver 910 may be an example of aspects of the transceiver 1135 described with reference to FIG. 11. The receiver 910 may utilize a single antenna or a set of antennas.

In some aspects, resource allocation manager 925 may identify that a TTI is allocated for a first type of communications in a first carrier. Control message manager 930 may receive, in a second carrier, a control message indicating that a portion of the TTI is assigned for a second type of communications in a downlink or uplink direction in the first carrier. Link direction configuration manager 935 may determine that the second type of communications is to preempt the first type of communications in the portion of the TTI based at least in part on receiving the control message. UE communications manager 915 may then communicate during the TTI based at least in part on receiving the control message and on the determination.

In other aspects, resource allocation manager 925 may identify that a TTI configured for communications in a downlink direction is allocated for a first type of communications in a first carrier. Low latency communications manager 940 may identify uplink signals associated with a second type of communications to transmit in the first carrier. SR manager 945 may transmit, in the first carrier or in a second carrier, an SR to request resources on which to transmit the uplink signals in the first carrier. Control message manager 930 may receive a control message indicating that a portion of the TTI is assigned for transmitting the uplink signals associated with the second type of communications. Link direction configuration manager 935 may determine that the portion of the TTI is configured for communications in an uplink direction based on receiving the control message. Low latency communications manager 940 may then transmit the uplink signals in the portion of the TTI based at least in part on receiving the control message and on the determination.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
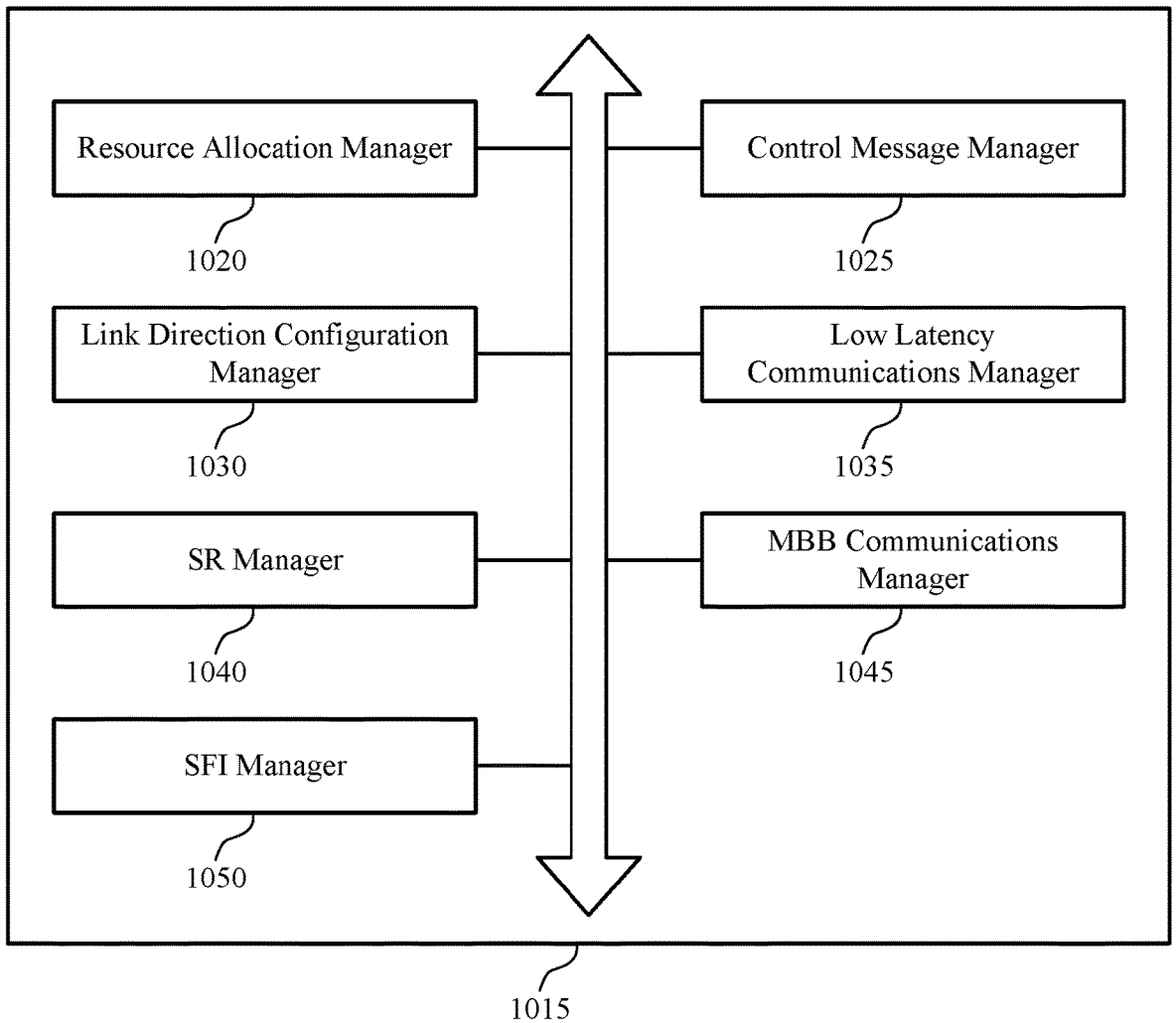

FIG. 10 shows a block diagram 1000 of a UE communications manager 1015 that supports PI for low latency communications on dynamically allocated resources in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include resource allocation manager 1020, control message manager 1025, link direction configuration manager 1030, low latency communications manager 1035, SR manager 1040, MBB communications manager 1045, and SFI manager 1050. Each of these modules may communicate, directly or indirectly, with one another (e.g., via one or more buses).

In some aspects, resource allocation manager 1020 may identify that a TTI is allocated for a first type of communications in a first carrier. Control message manager 1025 may receive, in a second carrier, a control message indicating that a portion of the TTI is assigned for a second type of communications in a downlink or uplink direction in the first carrier. Link direction configuration manager 1030 may determine that the second type of communications is to preempt the first type of communications in the portion of the TTI based at least in part on receiving the control message. UE communications manager 1015 may then communicate during the TTI based at least in part on receiving the control message and on the determination.

In some cases, UE communications manager 1015 may be operating in an ultra-reliable low latency mode, and low latency communications manager 1035 may receive low latency downlink signals or transmit low latency uplink signals during the portion of the TTI based at least in part on receiving the control message and on the determination. Alternatively, UE communications manager 1015 may receive low latency downlink signals transmitted during the portion of the TTI with a first transmit power or transmit low latency uplink signals during the portion of the TTI with the first transmit power, the first transmit power being greater than a second transmit power used by the UE communications manager 1015 or another UE communications manager operating in an MBB mode to transmit MBB uplink signals during the portion of the TTI.

In other cases, UE communications manager 1015 may be operating in an MBB mode, and MBB communications manager 1045 may cancel an MBB uplink transmission during the portion of the TTI based at least in part on receiving the control message and on the determination. Alternatively, UE communications manager 1015 may transmit MBB uplink signals during the portion of the TTI with a first transmit power, the first transmit power being lower than a second transmit power used by a base station to transmit low latency downlink signals during the portion of the TTI to the UE communications manager 1015 or another UE communications manager operating in an ultra-reliable low latency mode or the second transmit power used by the UE or another UE to transmit low latency uplink signals during the portion of the TTI to the base station.

In some cases, control message manager 1025 may monitor the second carrier during control message monitoring occasions for the control message. Alternatively, control message manager 1025 may monitor the first carrier during control message monitoring occasions for the control message when the control message monitoring occasions coincide with downlink symbols of the first carrier, and control message manager 1025 may monitor the second carrier during control message monitoring occasions for the control message when the control message monitoring occasions coincide with uplink symbols of the first carrier. The control message monitoring occasions may be periodic, and a periodicity of the control message monitoring occasions may be configured via RRC signaling. In some cases, SR manager 1040 may transmit, in the first carrier or in the second carrier, an SR to request resources on which to transmit uplink signals associated with the second type of communications in the first carrier, wherein the control message indicating that the portion of the TTI is assigned for the second type of communications in the uplink direction in the first carrier is received based at least in part on transmitting the SR.

In some cases, the control message further indicates the resources (e.g., specific frequency resources or time resources) of the first carrier that are assigned for the second type of communications. In some cases, the control message may be a first control message, and control message manager 1025 may receive a second control message in the first carrier that indicates the resources of the first carrier that are assigned for the second type of communications. In some cases, the second control message is received in a PDCCH. In some cases, SFI manager 1050 may receive an SFI indicating that the TTI is configured for communications in the downlink or uplink direction. In such cases, a downlink direction configuration indicated by the control message overrides an uplink direction configuration indicated by the SFI during the portion of the TTI. In some cases, the first carrier is a wideband carrier, and the second carrier is a narrowband carrier. In some cases, the first carrier is a first TDD carrier and the second carrier is a second TDD carrier. In some cases, the control message is a PI. In some cases, the first type of communications is MBB communications and the second type of communications is ultra-reliable low latency communications.

In other aspects, resource allocation manager 1020 may identify that a TTI configured for communications in a downlink direction is allocated for a first type of communications in a first carrier. Low latency communications manager 1035 may identify uplink signals associated with a second type of communications to transmit in the first carrier. SR manager 1040 may transmit, in the first carrier or in a second carrier, an SR to request resources on which to transmit the uplink signals in the first carrier. Control message manager 1025 may receive a control message indicating that a portion of the TTI is assigned for transmitting the uplink signals associated with the second type of communications. Link direction configuration manager 1030 may determine that the portion of the TTI is configured for communications in an uplink direction based on receiving the control message. Low latency communications manager 1035 may then transmit the uplink signals in the portion of the TTI based at least in part on receiving the control message and on the determination.

In some cases, SR manager 1040 may transmit the SR in an SR monitoring occasion of the first carrier or the second carrier. In some cases, SR manager 1040 may transmit the SR in an SR monitoring occasion of the first carrier when the SR monitoring occasion coincides with uplink symbols of the first carrier, and SR manager 1040 may transmit the SR in an SR monitoring of the second carrier when the SR monitoring occasion coincides with downlink symbols of the first carrier. In some cases, SR manager 1040 may transmit the SR in an SR monitoring occasion of the first carrier, the SR monitoring occasion coinciding with uplink symbols or downlink symbols of the first carrier. In some cases, SR manager 1040 may transmit the SR in an SR monitoring occasion of the second carrier.

In some cases, the control message further indicates the resources of the first carrier that are assigned for transmitting the uplink signals. In some cases, the first carrier is a wideband carrier and the second carrier is a narrowband carrier, and the UE is configured to monitor the narrowband carrier for control messages indicating that resources of the first carrier are allocated for the second type of communications. For example, the narrowband carrier may be a downlink carrier (e.g., anchor downlink carrier) available for a base station to transmit PIs to preempt a portion of a TTI for low latency communications, even when the TTI is configured for communications in a different link direction from the low latency communications. In some cases, the first carrier is a first TDD carrier and the second carrier is a second TDD carrier. In some cases, the control message is included in DCI received in a PDCCH in the first carrier. In some cases, the first type of communications is MBB communications and the second type of communications is ultra-reliable low latency communications.

Figure 11:
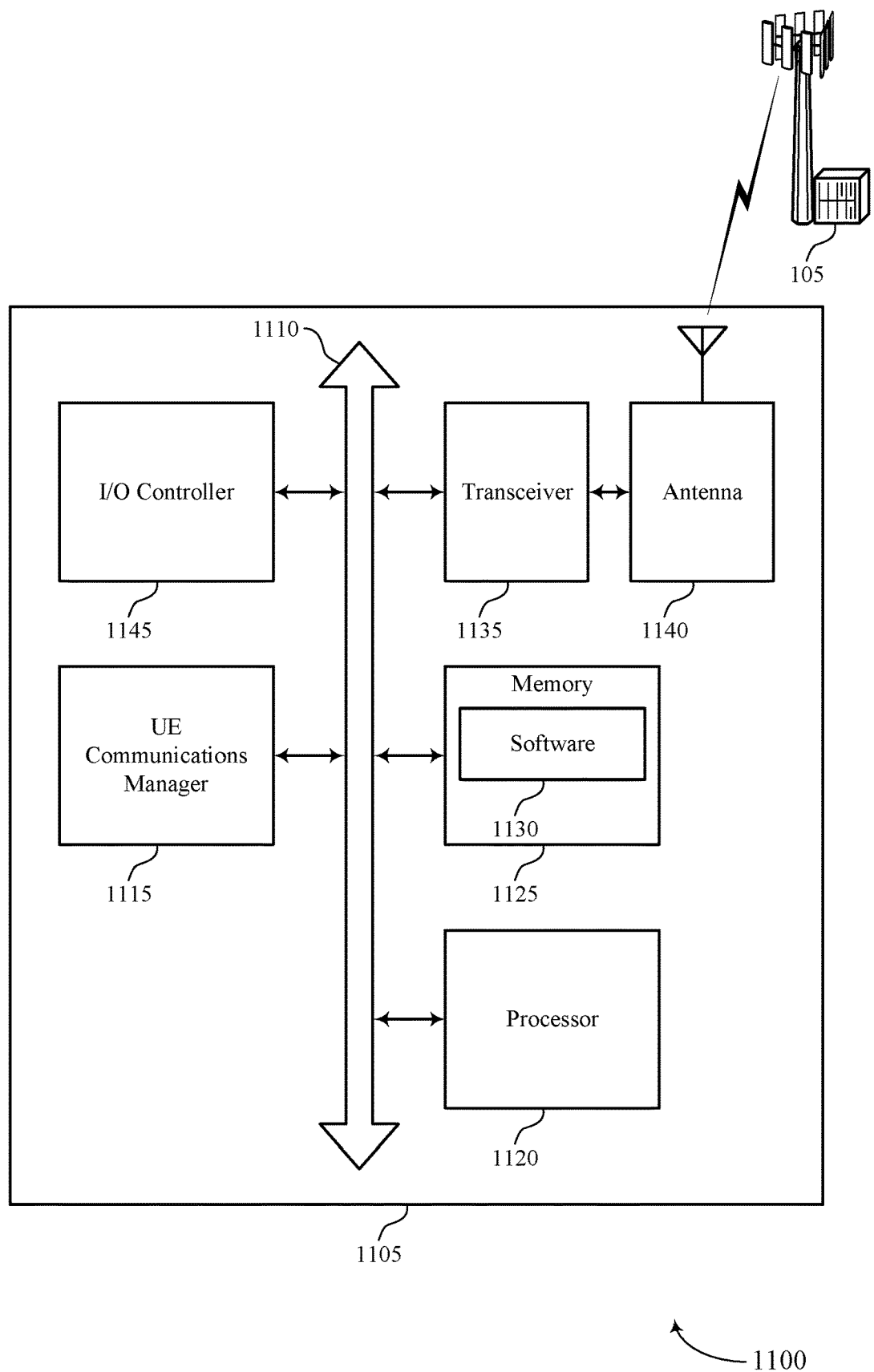
FIG. 11 illustrates a block diagram of a system including a user equipment (UE) that supports PIs for low latency communications on dynamically allocated resources in accordance with aspects of the present disclosure.

FIG. 11 shows a diagram of a system 1100 including a device 1105 that supports PI for low latency communications on dynamically allocated resources in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting PI for low latency communications on dynamically allocated resources).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support PI for low latency communications on dynamically allocated resources. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
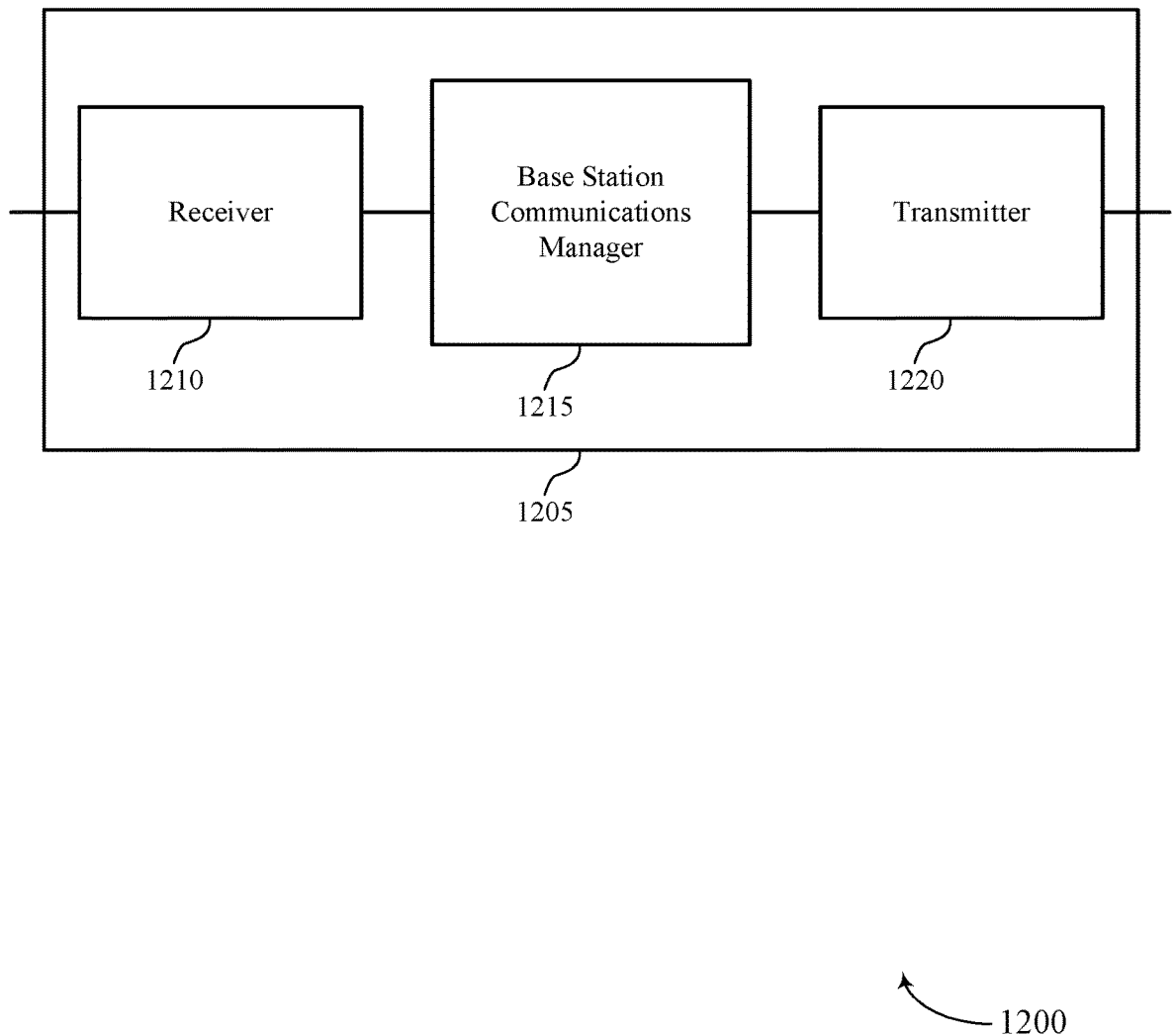
FIGS. 12-14 show block diagrams of a device that supports PIs for low latency communications on dynamically allocated resources in accordance with aspects of the present disclosure.

FIG. 12 shows a block diagram 1200 of a wireless device 1205 that supports PI for low latency communications on dynamically allocated resources in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to PI for low latency communications on dynamically allocated resources, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may identify that a TTI is allocated for a first type of communications with a first UE in a first carrier, identify downlink signals associated with a second type of communications to transmit to a second UE in the first carrier or that uplink signals associated with the second type of communications are to be received from the second UE in the first carrier, transmit, in a second carrier, a control message indicating that a portion of the TTI is assigned for transmitting the downlink signals associated with the second type of communications or receiving the uplink signals associated with the second type of communications in the first carrier, determine that the second type of communications is to preempt the first type of communications in the portion of the TTI based at least in part on transmitting the control message, and communicate during the TTI based on transmitting the control message and on the determination.

The base station communications manager 1215 may also identify that a TTI configured for communications in a downlink direction is allocated for a first type of communications in a first carrier, receive, in the first carrier or in a second carrier, a SR from a UE requesting resources on which to transmit uplink signals in the first carrier, transmit a control message indicating that a portion of the TTI is assigned for transmitting the uplink signals associated with the second type of communications, determine that the portion of the TTI is configured for communications in an uplink direction based on transmitting the control message, and receive the uplink signals from the UE in the portion of the TTI based on transmitting the control message and on the determination.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
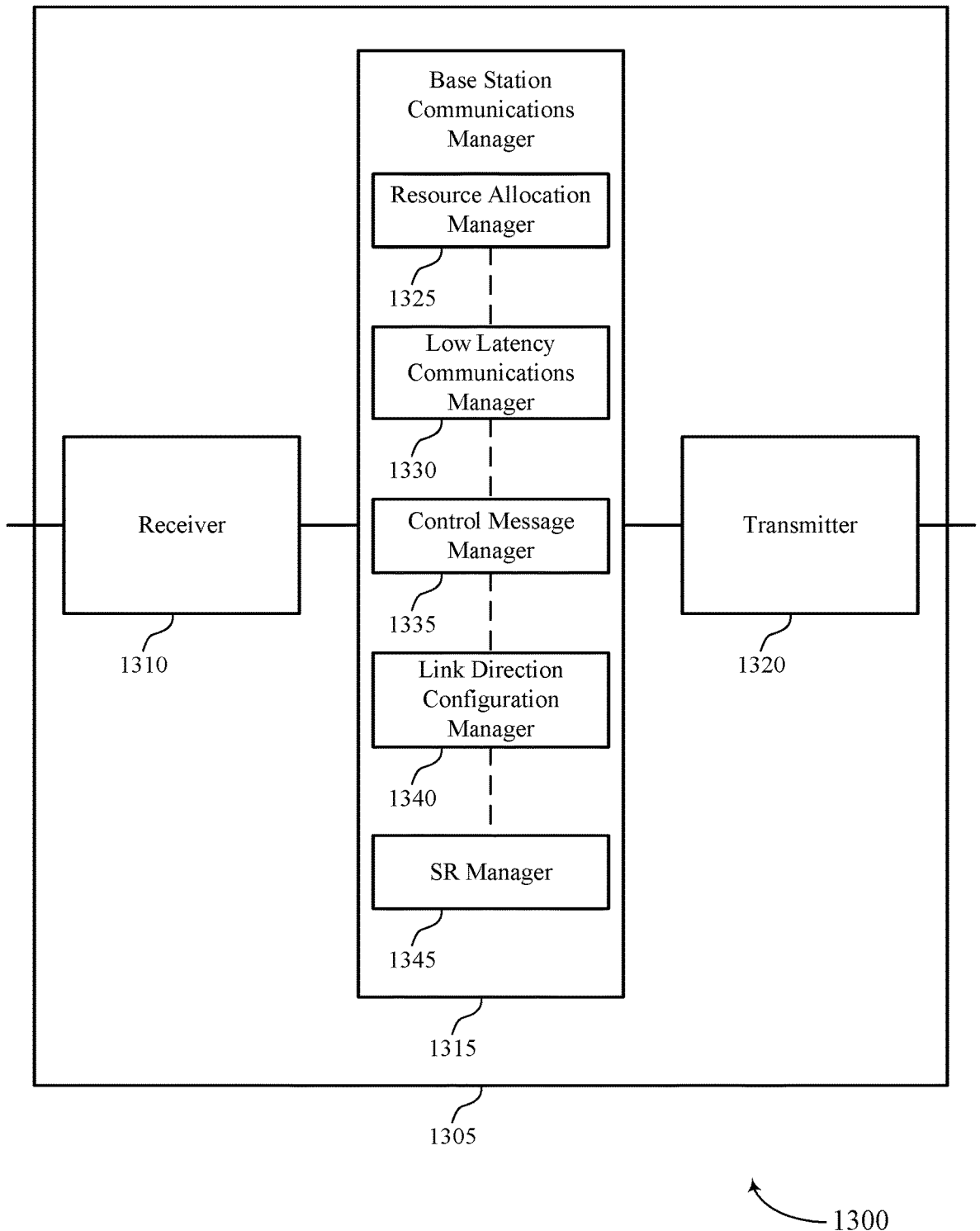

FIG. 13 shows a block diagram 1300 of a wireless device 1305 that supports PI for low latency communications on dynamically allocated resources in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Base station communications manager 1315 may be an example of aspects of the base station communications manager 1515 described with reference to FIG. 15. Base station communications manager 1315 may include resource allocation manager 1325, low latency communications manager 1330, control message manager 1335, link direction configuration manager 1340, and SR manager 1345. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to PI for low latency communications on dynamically allocated resources, etc.). Information may be passed on to other components of the device. The receiver 1310 may be an example of aspects of the transceiver 1535 described with reference to FIG. 15. The receiver 1310 may utilize a single antenna or a set of antennas.

In some aspects, resource allocation manager 1325 may identify that a TTI is allocated for a first type of communications with a first UE in a first carrier. Low latency communications manager 1330 may identify downlink signals associated with a second type of communications to transmit to a second UE in the first carrier or that uplink signals associated with the second type of communications are to be received from the second UE in the first carrier. Control message manager 1335 may transmit, in a second carrier, a control message indicating that a portion of the TTI is assigned for transmitting the downlink signals associated with the second type of communications or receiving the uplink signals associated with the second type of communications in the first carrier. Link direction configuration manager 1340 may determine that the second type of communications is to preempt the first type of communications in the portion of the TTI based at least in part on transmitting the control message. Base station communications manager 1315 may then communicate during the TTI based at least in part on transmitting the control message and on the determination.

In other aspects, resource allocation manager 1325 may identify that a TTI configured for communications in a downlink direction is allocated for a first type of communications in a first carrier. SR manager 1345 may receive, in the first carrier or in a second carrier, a SR from a UE requesting resources on which to transmit uplink signals in the first carrier. Control message manager 1335 may transmit a control message indicating that a portion of the TTI is assigned for transmitting the uplink signals associated with the second type of communications. Link direction configuration manager 1340 may determine that the portion of the TTI is configured for communications in an uplink direction based on transmitting the control message. Low latency communications manager 1330 may then receive the uplink signals from the UE in the portion of the TTI based at least in part on transmitting the control message and on the determination.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
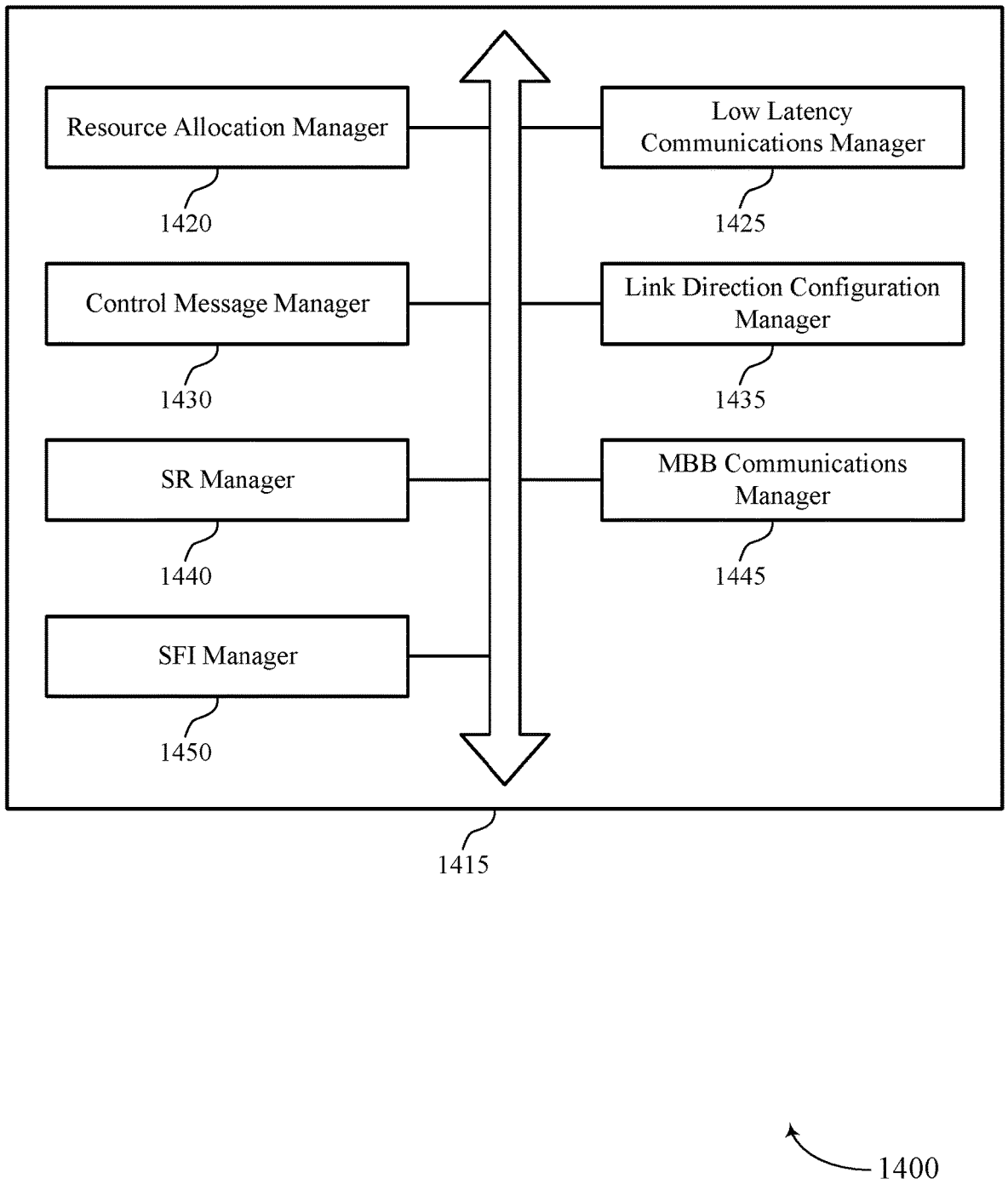

FIG. 14 shows a block diagram 1400 of a base station communications manager 1415 that supports PI for low latency communications on dynamically allocated resources in accordance with aspects of the present disclosure. The base station communications manager 1415 may be an example of aspects of a base station communications manager 1515 described with reference to FIGS. 12, 13, and 15. The base station communications manager 1415 may include resource allocation manager 1420, low latency communications manager 1425, control message manager 1430, link direction configuration manager 1435, SR manager 1440, MBB communications manager 1445, and SFI manager 1450. Each of these modules may communicate, directly or indirectly, with one another (e.g., via one or more buses).

In some aspects, resource allocation manager 1420 may identify that a TTI is allocated for a first type of communications with a first UE in a first carrier. Low latency communications manager 1425 may identify downlink signals associated with a second type of communications to transmit to a second UE in the first carrier or that uplink signals associated with the second type of communications are to be received from the second UE in the first carrier. Control message manager 1430 may transmit, in a second carrier, a control message indicating that a portion of the TTI is assigned for transmitting the downlink signals associated with the second type of communications or receiving the uplink signals associated with the second type of communications in the first carrier. Link direction configuration manager 1435 may determine that the second type of communications is to preempt the first type of communications in the portion of the TTI based at least in part on transmitting the control message. Base station communications manager 1415 may then communicate during the TTI based at least in part on transmitting the control message and on the determination.

In some cases, low latency communications manager 1425 may transmit the downlink signals associated with the second type of communications to the second UE or receive the uplink signals associated with the second type of communications from the second UE during the portion of the TTI based at least in part on transmitting the control message and on the determination. In some cases, MBB communications manager 1445 may determine that an uplink transmission from the first UE during the portion of the TTI is canceled based at least in part on transmitting the control message, and MBB communications manager 1445 may avoid monitoring for the uplink transmission based at least in part on determining that the uplink transmission is canceled. In some cases, MBB communications manager 1445 may receive other uplink signals associated with the first type of communications transmitted by the first UE with a first transmit power during the portion of the TTI based at least in part on transmitting the control message, and low latency communications manager 1425 may transmit the downlink signals associated with the second type of communications to the second UE during the portion of the TTI with a second transmit power or receive the uplink signals associated with the second type of communications from the second UE during the portion of the TTI with the second transmit power based at least in part on transmitting the control message, the second transmit power being greater than the first transmit power.

In some cases, the control message is transmitted in one of a plurality of control message monitoring occasions in the first carrier or the second carrier. In some cases, the control message further indicates the resources of the first carrier that are assigned for transmitting the downlink signals associated with the second type of communications or receiving the uplink signals associated with the second type of communications. In some cases, control message manager 1430 may transmit a second control message in the first carrier that indicates the resources of the first carrier that are assigned for transmitting the downlink signals associated with the second type of communications or receiving the uplink signals associated with the second type of communications. In some cases, the second control message is transmitted in a PDCCH.

In some cases, SFI manager 1450 may transmit an SFI indicating that the TTI is configured for communications in the downlink or uplink direction, where a downlink direction configuration indicated by the control message overrides an uplink direction configuration indicated by the SFI during the portion of the TTI. In some cases, the first UE is configured to operate in an MBB mode and the first type of communications includes MBB communications. In some cases, the first UE is configured to operate in an MBB mode and the first type of communications is MBB communications, and the second UE is configured to operate in an ultra-reliable low latency mode and the second type of communications is ultra-reliable low latency communications.

In other aspects, resource allocation manager 1420 may identify that a TTI configured for communications in a downlink direction is allocated for a first type of communications in a first carrier. SR manager 1440 may receive, in the first carrier or in a second carrier, a SR from a UE requesting resources on which to transmit uplink signals in the first carrier. Control message manager 1430 may transmit a control message indicating that a portion of the TTI is assigned for transmitting the uplink signals associated with the second type of communications. Link direction configuration manager 1435 may determine that the portion of the TTI is configured for communications in an uplink direction based on transmitting the control message. Low latency communications manager 1425 may then receive the uplink signals from the UE in the portion of the TTI based at least in part on transmitting the control message and on the determination.

In some cases, SR manager 1440 may receive the SR in an SR monitoring occasion of the first carrier or the second carrier. For example, SR manager 1440 may receive the SR in an SR monitoring occasion of the first carrier when the SR monitoring occasion coincides with uplink symbols of the first carrier, and SR manager 1440 may receive the SR in an SR monitoring occasion of the second carrier when the SR monitoring occasion coincides with downlink symbols of the first carrier. In some cases, SR manager 1440 may receive the SR in an SR monitoring occasion of the first carrier, the SR monitoring occasion coinciding with uplink symbols or downlink symbols of the first carrier. In some cases, SR manager 1440 may receive the SR in an SR monitoring occasion of the second carrier. In some cases, the control message further indicates the resources of the first carrier that are assigned to the UE for transmitting the uplink signals.

Figure 15:
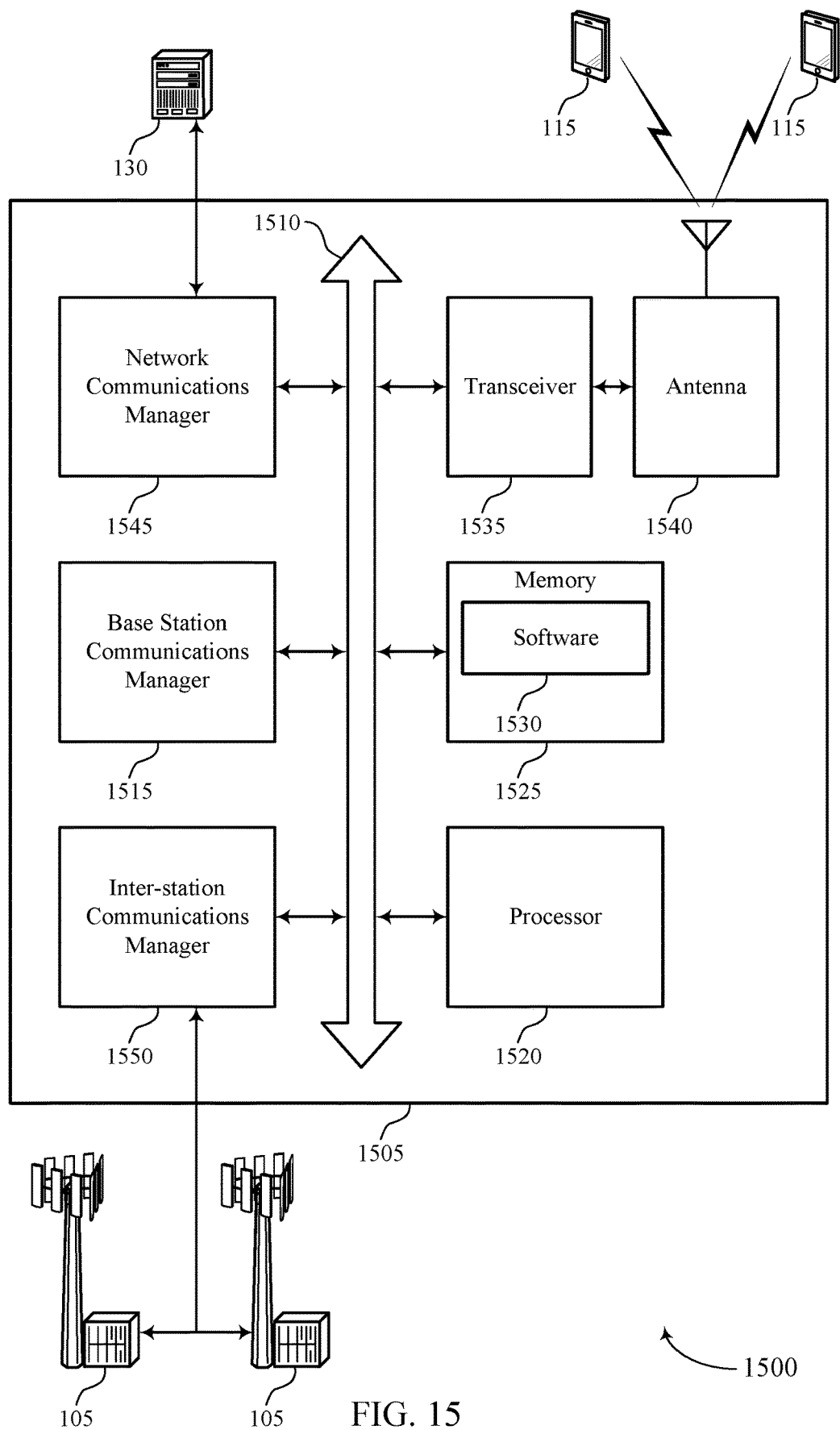
FIG. 15 illustrates a block diagram of a system including a base station that supports PIs for low latency communications on dynamically allocated resources in accordance with aspects of the present disclosure.

FIG. 15 shows a diagram of a system 1500 including a device 1505 that supports PI for low latency communications on dynamically allocated resources in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting PI for low latency communications on dynamically allocated resources).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support PI for low latency communications on dynamically allocated resources. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105 and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
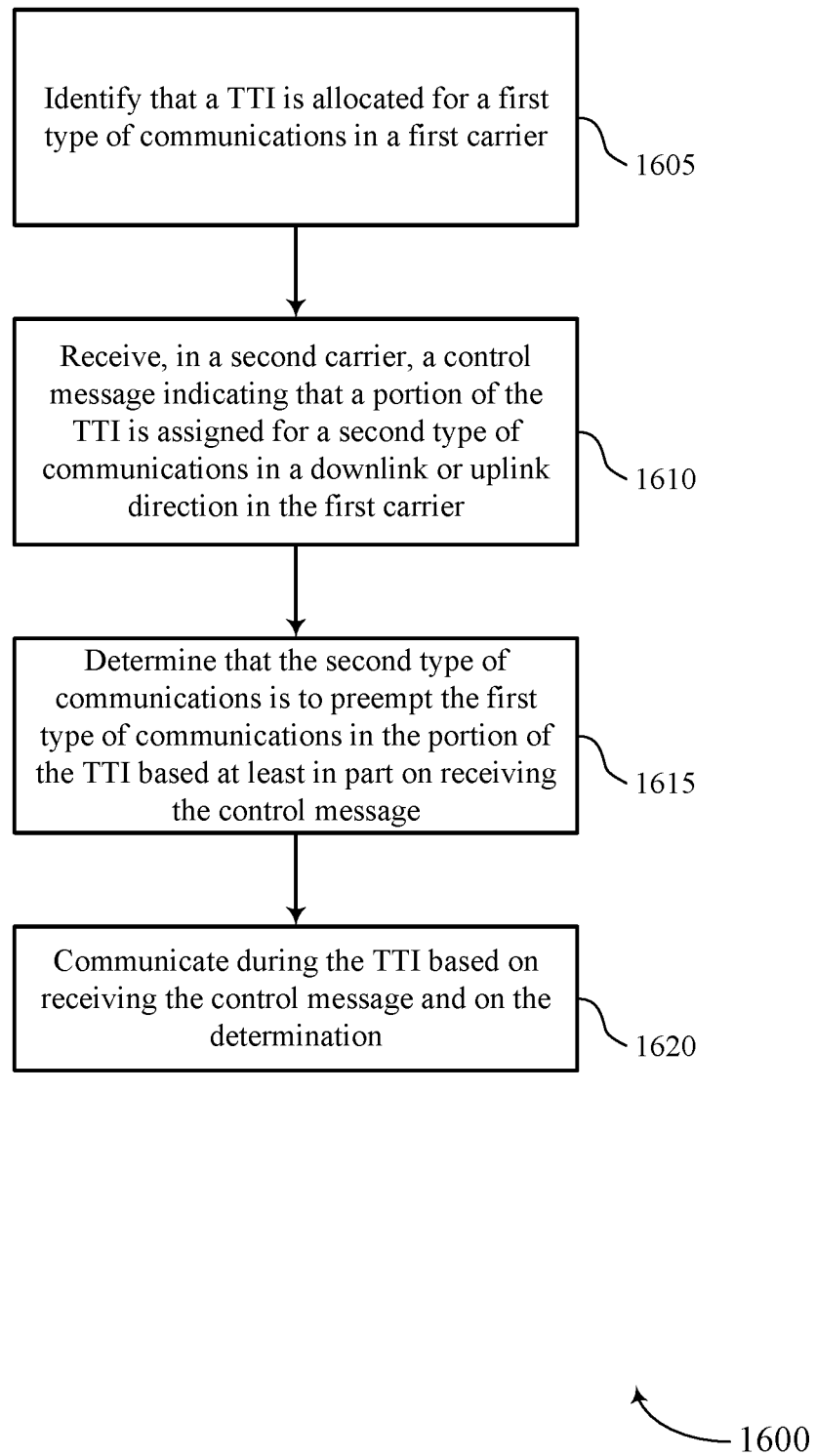
FIGS. 16-19 illustrate methods for supporting PIs for low latency communications on dynamically allocated resources in accordance with aspects of the present disclosure.

FIG. 16 shows a flowchart illustrating a method 1600 for PI for low latency communications on dynamically allocated resources in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally, or alternatively, the UE 115 may perform aspects of the functions described below using special-purpose hardware.

At 1605 the UE 115 may identify that a TTI is allocated for a first type of communications in a first carrier. The operations of 1605 may be performed according to the methods described herein. In certain examples, aspects of the operations of 1605 may be performed by a resource allocation manager as described with reference to FIGS. 8 through 11.

At 1610 the UE 115 may receive, in a second carrier, a control message indicating that a portion of the TTI is assigned for a second type of communications in a downlink or uplink direction in the first carrier. The operations of 1610 may be performed according to the methods described herein. In certain examples, aspects of the operations of 1610 may be performed by a control message manager as described with reference to FIGS. 8 through 11.

At 1615 the UE 115 may determine that the second type of communications is to preempt the first type of communications in the portion of the TTI based at least in part on receiving the control message. The operations of 1615 may be performed according to the methods described herein. In certain examples, aspects of the operations of 1615 may be performed by a link direction configuration manager as described with reference to FIGS. 8 through 11.

At 1620 the UE 115 may communicate during the TTI based at least in part on receiving the control message and on the determination. The operations of 1620 may be performed according to the methods described herein. In certain examples, aspects of the operations of 1620 may be performed by a transmitter as described with reference to FIGS. 8 through 11.

Figure 17:
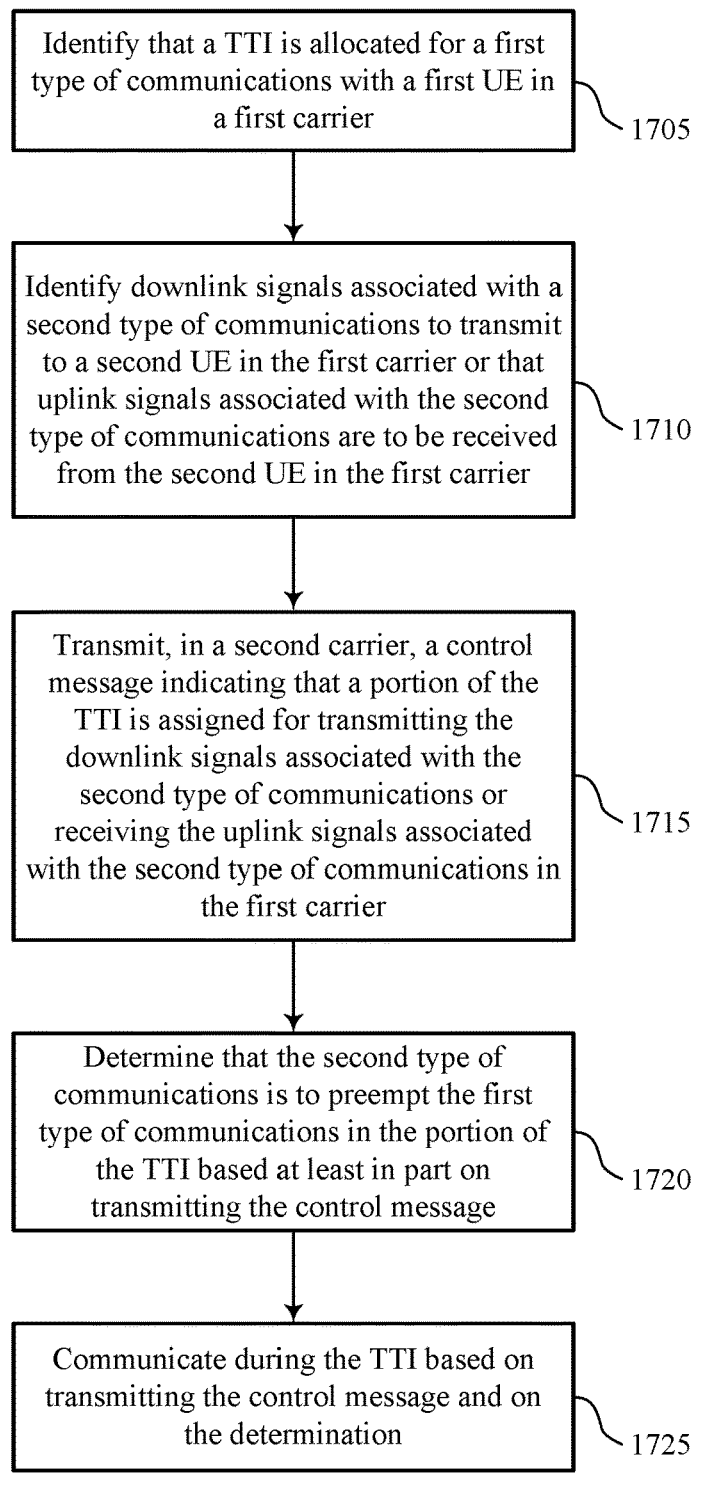

FIG. 17 shows a flowchart illustrating a method 1700 for PI for low latency communications on dynamically allocated resources in accordance with aspects of the present disclosure. The operations of method 1700 may be implemented by a base station 105 or its components as described herein. For example, the operations of method 1700 may be performed by a base station communications manager as described with reference to FIGS. 12 through 15. In some examples, a base station 105 may execute a set of codes to control the functional elements of the device to perform the functions described below. Additionally, or alternatively, the base station 105 may perform aspects of the functions described below using special-purpose hardware.

At 1705 the base station 105 may identify that a TTI is allocated for a first type of communications with a first UE in a first carrier. The operations of 1705 may be performed according to the methods described herein. In certain examples, aspects of the operations of 1705 may be performed by a resource allocation manager as described with reference to FIGS. 12 through 15.

At 1710 the base station 105 may identify downlink signals associated with a second type of communications to transmit to a second UE in the first carrier or that uplink signals associated with the second type of communications are to be received from the second UE in the first carrier. The operations of 1710 may be performed according to the methods described herein. In certain examples, aspects of the operations of 1710 may be performed by a low latency communications manager as described with reference to FIGS. 12 through 15.

At 1715 the base station 105 may transmit, in a second carrier, a control message indicating that a portion of the TTI is assigned for transmitting the downlink signals associated with the second type of communications or receiving the uplink signals associated with the second type of communications in the first carrier. The operations of 1715 may be performed according to the methods described herein. In certain examples, aspects of the operations of 1715 may be performed by a control message manager as described with reference to FIGS. 12 through 15.

At 1720 the base station 105 may determine that the second type of communications is to preempt the first type of communications in the portion of the TTI based at least in part on transmitting the control message. The operations of 1720 may be performed according to the methods described herein. In certain examples, aspects of the operations of 1720 may be performed by a link direction configuration manager as described with reference to FIGS. 12 through 15.

At 1725 the base station 105 may communicate during the TTI based at least in part on transmitting the control message and on the determination. The operations of 1725 may be performed according to the methods described herein. In certain examples, aspects of the operations of 1725 may be performed by a transmitter as described with reference to FIGS. 12 through 15.

Figure 18:
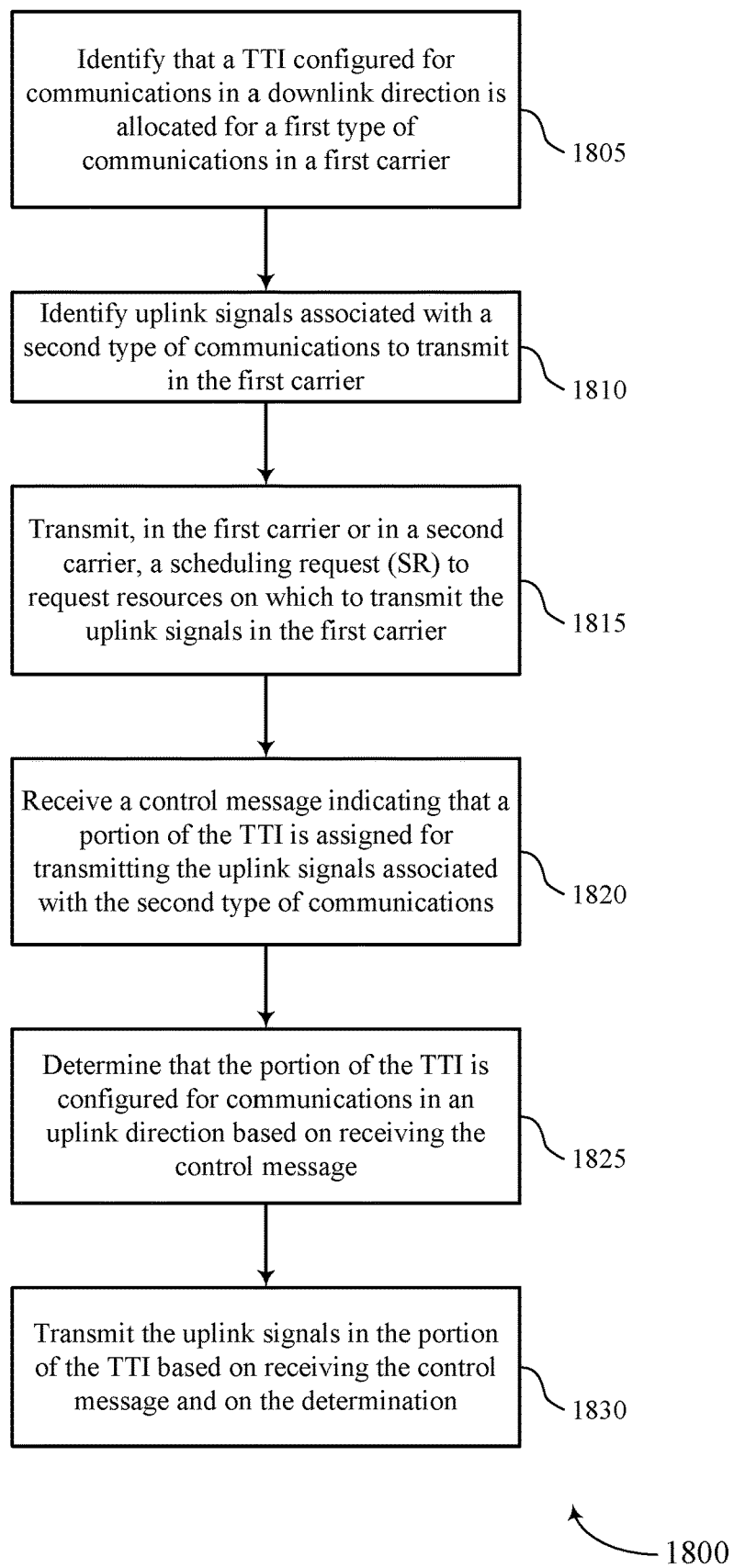

FIG. 18 shows a flowchart illustrating a method 1800 for PI for low latency communications on dynamically allocated resources in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE 115 may execute a set of codes to control the functional elements of the device to perform the functions described below. Additionally, or alternatively, the UE 115 may perform aspects of the functions described below using special-purpose hardware.

At 1805 the UE 115 may identify that a TTI configured for communications in a downlink direction is allocated for a first type of communications in a first carrier. The operations of 1805 may be performed according to the methods described herein. In certain examples, aspects of the operations of 1805 may be performed by a resource allocation manager as described with reference to FIGS. 8 through 11.

At 1810 the UE 115 may identify uplink signals associated with a second type of communications to transmit in the first carrier. The operations of 1810 may be performed according to the methods described herein. In certain examples, aspects of the operations of 1810 may be performed by a low latency communications manager as described with reference to FIGS. 8 through 11.

At 1815 the UE 115 may transmit, in the first carrier or in a second carrier, an SR to request resources on which to transmit the uplink signals in the first carrier. The operations of 1815 may be performed according to the methods described herein. In certain examples, aspects of the operations of 1815 may be performed by a SR manager as described with reference to FIGS. 8 through 11.

At 1820 the UE 115 may receive a control message indicating that a portion of the TTI is assigned for transmitting the uplink signals associated with the second type of communications. The operations of 1820 may be performed according to the methods described herein. In certain examples, aspects of the operations of 1820 may be performed by a control message manager as described with reference to FIGS. 8 through 11.

At 1825 the UE 115 may determine that the portion of the TTI is configured for communications in an uplink direction based at least in part on receiving the control message. The operations of 1825 may be performed according to the methods described herein. In certain examples, aspects of the operations of 1825 may be performed by a link direction configuration manager as described with reference to FIGS. 8 through 11.

At 1830 the UE 115 may transmit the uplink signals in the portion of the TTI based at least in part on receiving the control message and on the determination. The operations of 1830 may be performed according to the methods described herein. In certain examples, aspects of the operations of 1830 may be performed by a low latency communications manager as described with reference to FIGS. 8 through 11.

Figure 19:
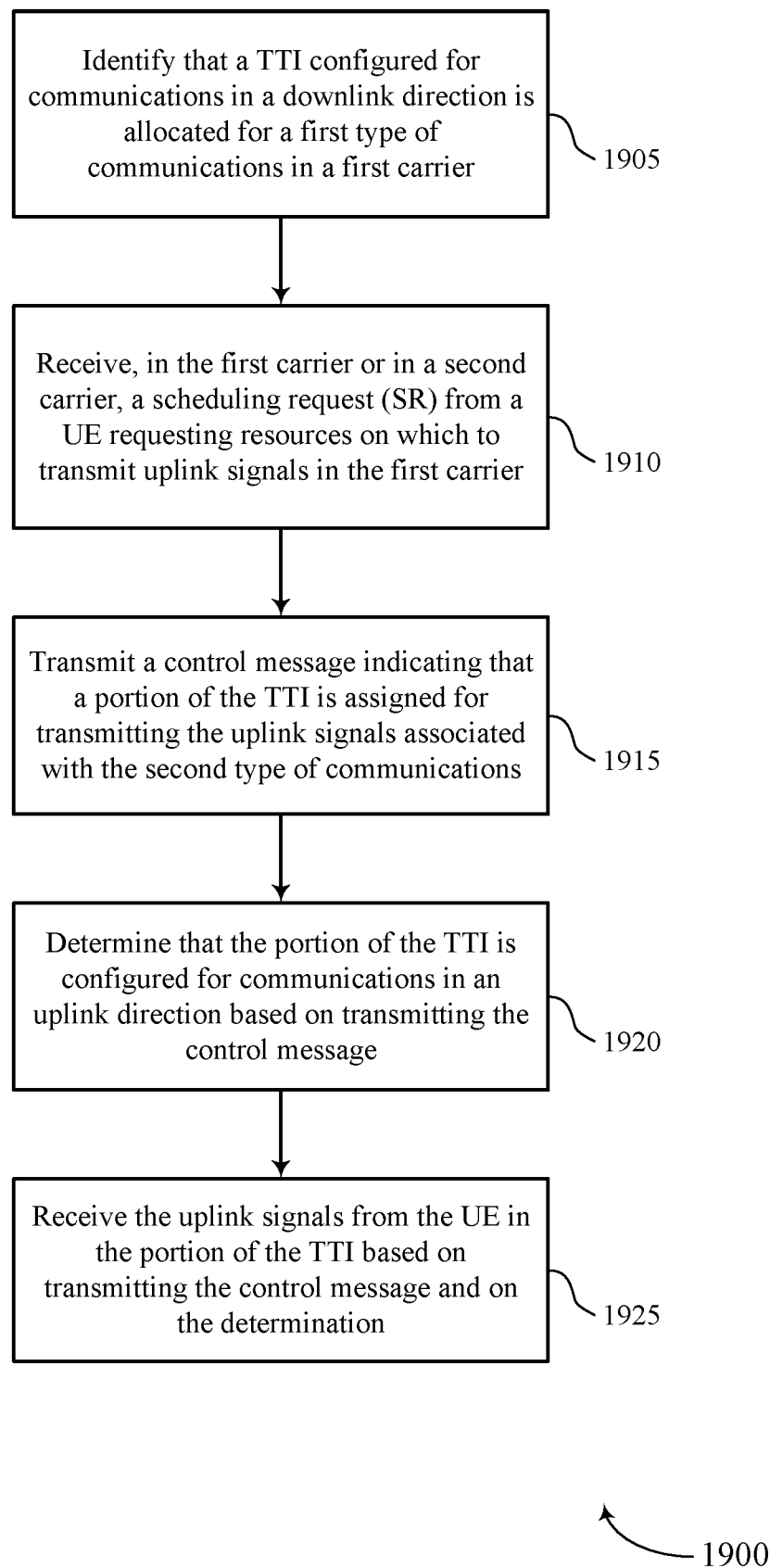

FIG. 19 shows a flowchart illustrating a method 1900 for PI for low latency communications on dynamically allocated resources in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally, or alternatively, the base station 105 may perform aspects of the functions described below using special-purpose hardware.

At 1905 the base station 105 may identify that a TTI configured for communications in a downlink direction is allocated for a first type of communications in a first carrier. The operations of 1905 may be performed according to the methods described herein. In certain examples, aspects of the operations of 1905 may be performed by a resource allocation manager as described with reference to FIGS. 12 through 15.

At 1910 the base station 105 may receive, in the first carrier or in a second carrier, an SR from a UE requesting resources on which to transmit uplink signals in the first carrier. The operations of 1910 may be performed according to the methods described herein. In certain examples, aspects of the operations of 1910 may be performed by a SR manager as described with reference to FIGS. 12 through 15.

At 1915 the base station 105 may transmit a control message indicating that a portion of the TTI is assigned for transmitting the uplink signals associated with the second type of communications. The operations of 1915 may be performed according to the methods described herein. In certain examples, aspects of the operations of 1915 may be performed by a control message manager as described with reference to FIGS. 12 through 15.

At 1920 the base station 105 may determine that the portion of the TTI is configured for communications in an uplink direction based at least in part on transmitting the control message. The operations of 1920 may be performed according to the methods described herein. In certain examples, aspects of the operations of 1920 may be performed by a link direction configuration manager as described with reference to FIGS. 12 through 15.

At 1925 the base station 105 may receive the uplink signals from the UE in the portion of the TTI based at least in part on transmitting the control message and on the determination. The operations of 1925 may be performed according to the methods described herein. In certain examples, aspects of the operations of 1925 may be performed by a low latency communications manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that a transmission time interval (TTI) configured for communications in a first link direction is allocated for a first type of communications in a first carrier, the first link direction being uplink or downlink;
    monitoring for a control message based at least in part on a remaining duration of the TTI in the first carrier being greater than a threshold, wherein the threshold comprises less time than a full duration of the TTI;
    receiving, in a second carrier, the control message indicating that a portion of the TTI is assigned for a second type of communications in a second link direction in the first carrier, the second link direction being different from the first link direction;
    determining that the second type of communications is to preempt the first type of communications in the portion of the TTI based at least in part on receiving the control message; and
    communicating during the TTI based at least in part on receiving the control message and on the determination.

2. The method of claim 1, wherein the UE is operating in an ultra-reliable low latency mode, and wherein communicating during the TTI based at least in part on receiving the control message and on the determination comprises:
    receiving low latency downlink signals or transmitting low latency uplink signals during the portion of the TTI based at least in part on receiving the control message and on the determination.

3. The method of claim 1, wherein the UE is operating in a mobile broadband (MBB) mode, and wherein communicating during the TTI based at least in part on receiving the control message and on the determination comprises:
    canceling an MBB uplink transmission during the portion of the TTI based at least in part on receiving the control message and on the determination.

4. The method of claim 1, wherein the UE is operating in an ultra-reliable low latency mode, and wherein communicating during the TTI based at least in part on receiving the control message and on the determination comprises:
    receiving low latency downlink signals transmitted during the portion of the TTI with a first transmit power or transmitting low latency uplink signals during the portion of the TTI with the first transmit power, the first transmit power being greater than a second transmit power used by the UE or another UE operating in a mobile broadband (MBB) mode to transmit MBB uplink signals during the portion of the TTI.

5. The method of claim 1, wherein the UE is operating in a mobile broadband (MBB) mode, and wherein communicating during the TTI based at least in part on receiving the control message and on the determination comprises:
    transmitting MBB uplink signals during the portion of the TTI with a first transmit power, the first transmit power being lower than a second transmit power used by a base station to transmit low latency downlink signals during the portion of the TTI to the UE or another UE operating in an ultra-reliable low latency mode or the second transmit power used by the UE or another UE to transmit low latency uplink signals during the portion of the TTI to the base station.

6. The method of claim 1, further comprising:
monitoring the second carrier during control message monitoring occasions for the control message.

7. The method of claim 6, wherein the control message monitoring occasions are periodic, and a periodicity of the control message monitoring occasions is configured via radio resource control (RRC) signaling.

8. The method of claim 1, further comprising:
monitoring the first carrier during control message monitoring occasions for the control message when the control message monitoring occasions coincide with downlink symbols of the first carrier; and
monitoring the second carrier during the control message monitoring occasions for the control message when the control message monitoring occasions coincide with uplink symbols of the first carrier.

9. The method of claim 8, wherein the control message monitoring occasions are periodic, and a periodicity of the control message monitoring occasions is configured via radio resource control (RRC) signaling.

10. The method of claim 1, wherein the control message further indicates resources of the first carrier that are assigned for the second type of communications.

11. The method of claim 1, further comprising:
receiving a second control message in the first carrier that indicates resources of the first carrier that are assigned for the second type of communications.

12. The method of claim 11, wherein the second control message is received in a physical downlink control channel (PDCCH).

13. The method of claim 1, further comprising:
receiving a slot format indication (SFI) indicating that the TTI is configured for communications in the first link direction, wherein a second link direction configuration indicated by the control message overrides the first link direction indicated by the SFI during the portion of the TTI.

14. The method of claim 1, wherein the first carrier comprises a wideband carrier, and the second carrier comprises a narrowband carrier, and the UE is configured to monitor the narrowband carrier for control messages indicating that resources of the first carrier are allocated for the second type of communications.

15. The method of claim 1, wherein the first carrier comprises a first time division duplex (TDD) carrier, and the second carrier comprises a second TDD carrier.

16. The method of claim 1, wherein the control message comprises a preemption indication (PI).

17. The method of claim 1, wherein the first type of communications comprises mobile broadband (MBB) communications and the second type of communications comprises ultra-reliable low latency communications.

18. The method of claim 1, further comprising:
transmitting, in the first carrier or in the second carrier, a scheduling request (SR) to request resources on which to transmit uplink signals associated with the second type of communications in the first carrier, wherein the control message indicating that the portion of the TTI is assigned for the second type of communications in the second link direction in the first carrier is received based at least in part on transmitting the SR, and wherein the first link direction is downlink and the second link direction is uplink.

19. An apparatus for wireless communication at a user equipment (UE), comprising:
a processor;
memory coupled with the processor; and
instructions stored in the memory and executable by the processor to cause the apparatus to:
identify that a transmission time interval (TTI) configured for communications in a first link direction is allocated for a first type of communications in a first carrier, the first link direction being uplink or downlink;
monitor for a control message based at least in part on a remaining duration of the TTI in the first carrier being greater than a threshold, wherein the threshold comprises less time than a full duration of the TTI;
receive, in a second carrier, the control message indicating that a portion of the TTI is assigned for a second type of communications in a second link direction in the first carrier, the second link direction being different from the first link direction;
determine that the second type of communications is to preempt the first type of communications in the portion of the TTI based at least in part on receiving the control message; and
communicate during the TTI based at least in part on receiving the control message and on the determination.

* * * * *